US008625548B2

(12) United States Patent
Bennett

(10) Patent No.: US 8,625,548 B2
(45) Date of Patent: Jan. 7, 2014

(54) ACCESS POINTS OF DIFFERENT TYPES EXCHANGING ADDRESSES AND RULES TO SUPPORT END POINTS DEVICES

(75) Inventor: James D. Bennett, San Clemete, CA (US)

(73) Assignee: Broadcom Corporation, Irvine, CA (US)

( * ) Notice: Subject to any disclaimer, the term of this patent is extended or adjusted under 35 U.S.C. 154(b) by 1890 days.

(21) Appl. No.: 11/641,368

(22) Filed: Dec. 18, 2006

(65) Prior Publication Data

US 2007/0110084 A1    May 17, 2007

Related U.S. Application Data

(63) Continuation-in-part of application No. 11/365,102, filed on Mar. 1, 2006, now Pat. No. 7,626,994, and a continuation-in-part of application No. 11/394,253, filed on Mar. 30, 2006, and a continuation-in-part of application No. 11/418,644, filed on May 5, 2006, and a continuation-in-part of application No. 11/448,240, filed on Jun. 6, 2006, and a continuation-in-part of application No. 11/494,680, filed on Jul. 27, 2006, and a continuation-in-part of application No. 11/506,262, filed on Aug. 18, 2006, and a continuation-in-part of application No. 11/527,139, filed on Sep. 26, 2006.

(60) Provisional application No. 60/736,889, filed on Nov. 14, 2005.

(51) Int. Cl.
*H04W 4/00* (2009.01)
*H04L 12/28* (2006.01)
*H04M 3/00* (2006.01)
*H04W 40/00* (2009.01)
*H04W 36/00* (2009.01)

(52) U.S. Cl.
USPC ........... 370/338; 370/331; 370/254; 370/351; 455/445; 455/418; 455/432.1; 455/436

(58) Field of Classification Search
USPC ..................... 370/331, 401, 338, 254, 351; 455/412.1–414.1, 417–420, 432.1–449
See application file for complete search history.

(56) References Cited

U.S. PATENT DOCUMENTS

| | | | |
|---|---|---|---|
| 7,333,451 B1 * | 2/2008 | Khalil et al. | 370/331 |
| 2002/0046292 A1 * | 4/2002 | Tennison et al. | 709/238 |
| 2002/0160771 A1 | 10/2002 | Massie | |
| 2002/0191562 A1 * | 12/2002 | Kumaki et al. | 370/331 |
| 2002/0194385 A1 | 12/2002 | Linder et al. | |
| 2004/0068571 A1 * | 4/2004 | Ahmavaara | 709/228 |
| 2004/0072588 A1 * | 4/2004 | Beach et al. | 455/550.1 |
| 2004/0170181 A1 | 9/2004 | Bogdon et al. | |
| 2004/0228303 A1 * | 11/2004 | Kelly et al. | 370/331 |
| 2005/0083899 A1 * | 4/2005 | Babbar et al. | 370/342 |
| 2005/0119001 A1 * | 6/2005 | Watanabe | 455/436 |
| 2005/0130660 A1 * | 6/2005 | Park et al. | 455/436 |
| 2005/0176473 A1 * | 8/2005 | Melpignano | 455/574 |
| 2006/0023676 A1 | 2/2006 | Whitmore et al. | |
| 2006/0062206 A1 | 3/2006 | Krishnaswamy | |
| 2006/0084439 A1 * | 4/2006 | Joshi et al. | 455/436 |
| 2006/0128385 A1 * | 6/2006 | Lee et al. | 455/436 |
| 2006/0129630 A1 * | 6/2006 | Catalina-Gallego et al. | 709/203 |
| 2006/0291419 A1 * | 12/2006 | McConnell et al. | 370/331 |
| 2007/0025270 A1 * | 2/2007 | Sylvain | 370/254 |
| 2007/0060127 A1 * | 3/2007 | Forsberg | 455/436 |
| 2007/0135159 A1 * | 6/2007 | Sinivaara | 455/552.1 |
| 2007/0217349 A1 * | 9/2007 | Fodor et al. | 370/310.2 |
| 2008/0008196 A1 * | 1/2008 | Hong | 370/401 |

FOREIGN PATENT DOCUMENTS

| | | | |
|---|---|---|---|
| EP | 1089495 | A2 | 4/2001 |
| EP | 1517575 | A | 3/2005 |
| EP | 1 587 262 | A | 10/2005 |
| EP | 1589781 | A | 10/2005 |
| WO | 0163946 | A | 8/2001 |

* cited by examiner

Primary Examiner — Vladimir Magloire
Assistant Examiner — Michael Mapa

(74) *Attorney, Agent, or Firm* — Garlick & Markison; Bruce E. Garlick

(57) ABSTRACT

An end-point device comprises multiple transceivers via which the end-point device associates with multiple access points simultaneously. The access points may belong to communicatively incompatible packet switched data networks. A backbone network communicatively connects all associated access points. The end-point device receives unique network address of an access point from the access point upon association and sends network addresses of other currently associated access points and first rule information to the access point either upon association or prior to detaching from the access point. One or more of the other currently associated access points may direct above action of the end-point device. The end-point device or one of the other access points generates the first rule information. The access point on identifying detachment of the end-point device from it uses one or more of the network addresses of other currently associated access points to deliver data packets to the end-point device via the backbone network and corresponding access point(s). Any one of the associated access points sends second rule information to another of the associated access points via the backbone network wherein the second rule information comprises information regarding pathway to be used, type of data to be delivered, duration of interaction between the access point and the detached end-point device via the backbone network etc.

24 Claims, 10 Drawing Sheets

ACCESS POINTS OF DIFFERENT TYPES EXCHANGING ADDRESSES AND RULES TO SUPPORT END POINTS DEVICES

CROSS-REFERENCE TO RELATED APPLICATIONS/INCORPORATION BY REFERENCE

The present application is a continuation-in-part of:

1. U.S. Utility application Ser. No. 11/365,102, filed Mar. 1, 2006 now U.S. Pat. No. 7,626,994 and entitled "MULTIPLE NODE APPLICATIONS COOPERATIVELY MANAGING A PLURALITY OF PACKET SWITCHED NETWORK PATHWAYS";

2. U.S. Utility application Ser. No. 11/394,253, filed Mar. 30, 2006 and entitled "NETWORK NODES COOPERATIVELY ROUTING TRAFFIC FLOW AMONGST WIRED AND WIRELESS NETWORK";

3. U.S. Utility application Ser. No. 11/418,644, filed May 5, 2006 and entitled "PATHWAY PARAMETER EXCHANGE BETWEEN ACCESS NETWORKS OF DIFFERING TYPES";

4. U.S. Utility application Ser. No. 11/448,240, filed Jun. 6, 2006 and entitled "ACCESS POINT SUPPORTING DIRECT AND INDIRECT DOWNSTREAM DELIVERY BASED ON COMMUNICATION CHARACTERISTICS", all of which are incorporated by reference herein in their entirety for all purposes;

5. U.S. Utility application Ser. No. 11/494,680, filed Jul. 27, 2006 and entitled "INDIRECT COMMAND PATHWAYS BETWEEN AN END POINT DEVICE AND A TARGET ACCESS POINT VIA A SECONDARY ACCESS POINT";

6. U.S. Utility application Ser. No. 11/506,262, filed Aug. 18, 2006 and entitled "PRIMARY PROTOCOL STACK HAVING A SECONDARY PROTOCOL STACK ENTRY POINT"; and 7. U.S. Utility application Ser. No. 11/527,139, filed Sep. 26, 2006 and entitled "BRIDGING END POINT DEVICE SUPPORTING INTER ACCESS POINT COMMUNICATION", all of which claim priority to U.S. provisional application Ser. No. 60/736,889, filed Nov. 14, 2005, which is incorporated herein by reference for all purposes, and all of which are incorporated by reference herein in their entirety for all purposes.

CROSS-REFERENCE TO RELATED APPLICATIONS/INCORPORATION BY REFERENCE

[Applicable]

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

1. Field of the Invention

Various aspects of present invention relate to indirect delivery of data to a destination device via a variety of heterogeneous type of data networks when the destination device is unreachable directly.

2. Description of the Related Art

A computer, video game box, laptop, phone, PDA (Personal Digital Assistant) and many other types of terminals may be connected to a packet switched data network via an access point. The packet switched data network may be, for example, an EDGE (Enhanced Data Rates for GSM Evolution) network, GSM (Global System for Mobile Communications) network, CDMA (Code Division Multiple Access) network, IEEE (Institute of Electrical and Electronics Engineers) 802.11 network, Bluetooth, WiMax network, Internet, Intranet, satellite network, etc. The data packets typically comprise one or combination of real time and/or archived multimedia information such as text, audio, video, picture, and control signal.

The terminal may be associated with more than one access points that belong to the same packet switched data network. Alternately or in addition the terminal may be associated with more than one access points that belong to different packet switched data networks which are communicatively incompatible with each other. The different packet switched communicatively compatible and/or incompatible data networks are communicatively coupled to each other via a backbone network. The terminal receives unique network addresses of the access points from each of the access points upon association. The terminal uses the received network addresses to exchange data packets with corresponding access points. For example the terminal may be associated with a first access point that belongs to an EDGE network, a second access point that belongs to a GSM network and a third access point that belongs to an IEEE 802.11 network. The terminal receives a first network address of the first access point from the first access point upon association with the first access point. The terminal uses the first network address to send data packets to the first access point. Similarly the terminal receives a second network address and a third network address corresponding to the second access point and the third access point respectively.

The terminal may get detached from any of the associated access points at an instant of time. For example the terminal detaches from the first access point that belongs to the EDGE network at the instant of time. Detachment may typically happen if the terminal moves away from service area of the first access point and/or communication link between the first access point and the terminal does not support desired QOS for delivery of the data packets to the terminal at the instant of time. The terminal is henceforth unable to send and/or receive data packets from the first access point. Since the first access point is point of contact between the terminal and the EDGE network, the terminal is henceforth unable to communicate with any node or terminal belonging to the EDGE network.

Further limitations and disadvantages of conventional and traditional approaches will become apparent to one of ordinary skill in the art through comparison of such systems with various aspects of the present invention.

BRIEF SUMMARY OF THE INVENTION

An access point that interacts with a second access point via an upstream backbone network and a variety of heterogeneous type of data networks to deliver data to a downstream destination device when the access point is unable to deliver the data directly to the downstream destination device, substantially as shown in and/or described in connection with at least one of the figures, as set forth more completely in the claims. These and other advantages, aspects and novel features of the present invention, as well as details of illustrative aspects thereof, will be more fully understood from the following description and drawings.

BRIEF DESCRIPTION OF THE DRAWINGS

For various aspects of the present invention to be easily understood and readily practiced, various aspects will now be described, for purposes of illustration and not limitation, in conjunction with the following figures.

Figure 8:
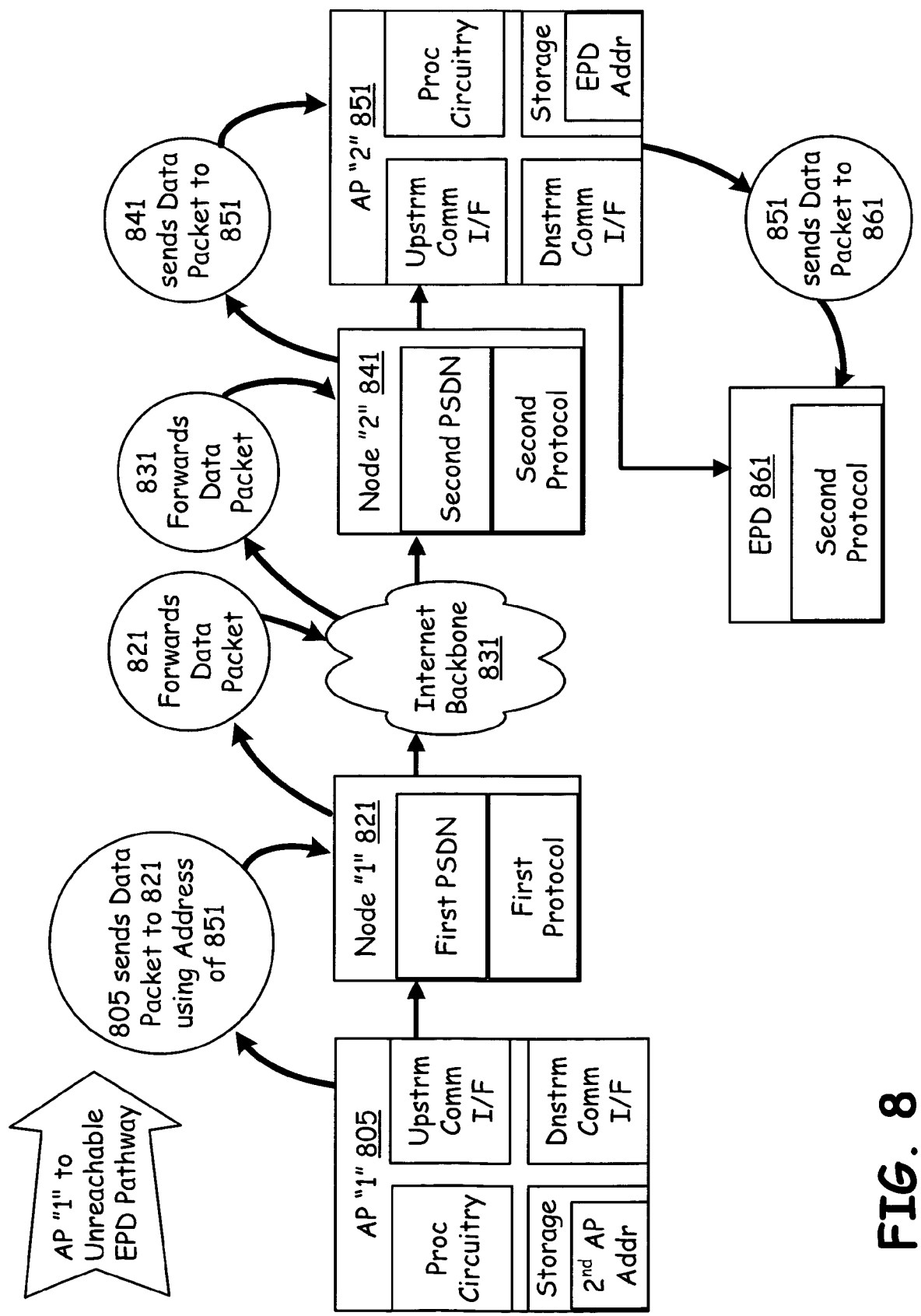
Figure 9:
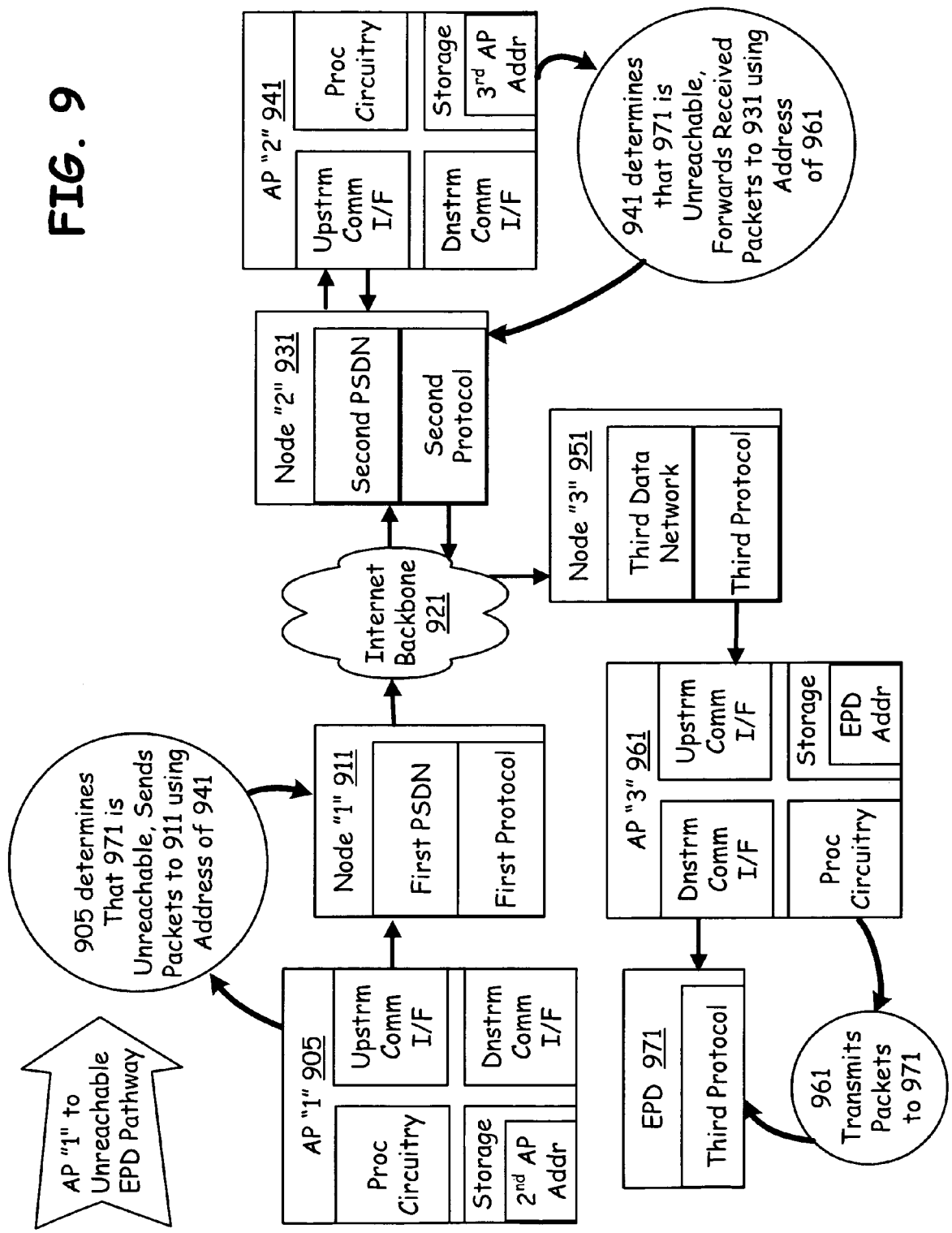
Figure 10:
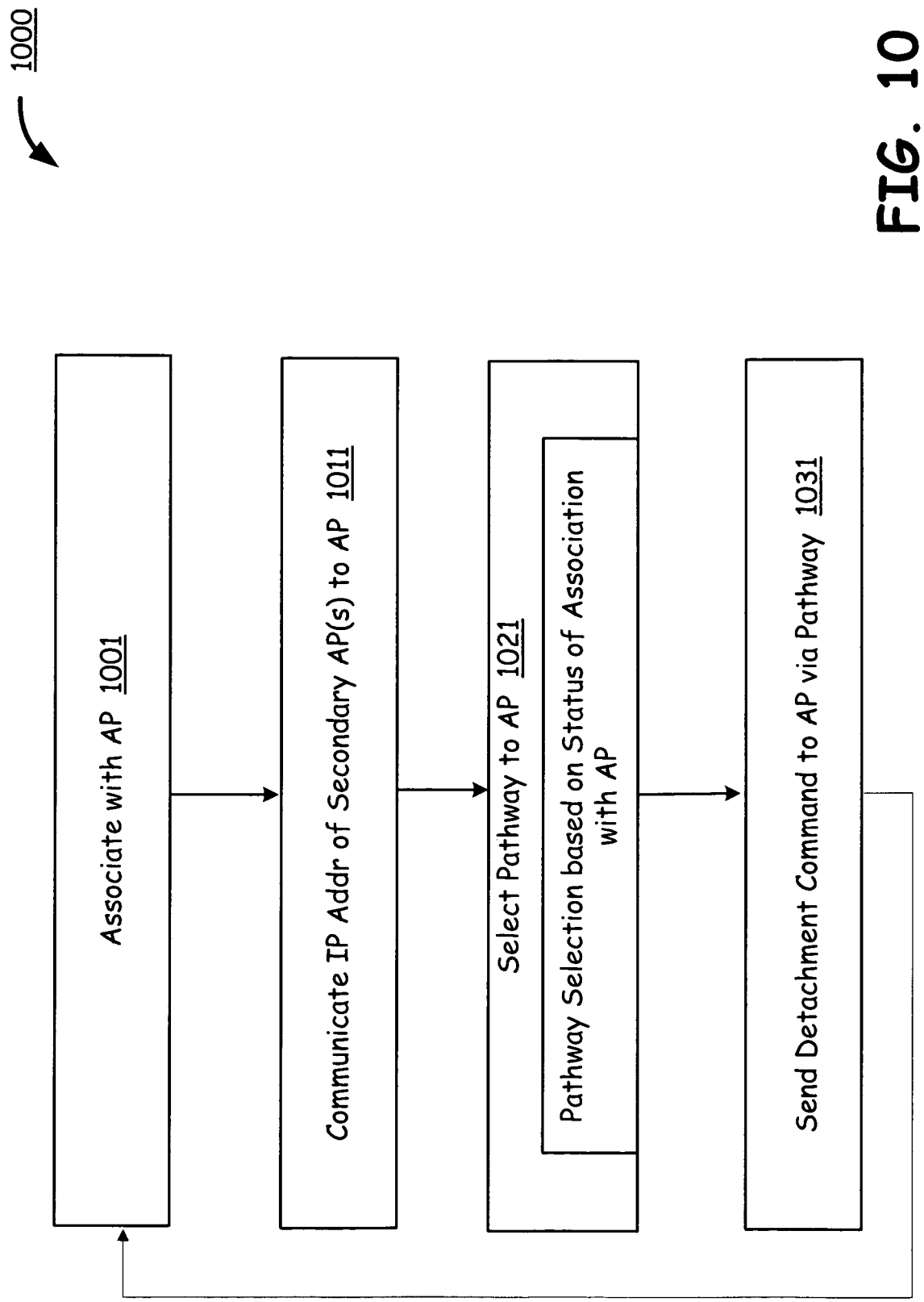

8 is a flow chart illustrating a method of delivering a data packet to an end-point device by a first access point via a second access point and Internet backbone;

9 is a flow chart illustrating the method of delivering the data packet to the end-point device by the first access point via the second access point and the Internet backbone of FIG. 8, wherein a third access point cooperates in delivering the data packet to the end-point device; and FIG. 10 is a flow chart illustrating a method of delivery of detachment command to an upstream access point via an upstream pathway by an end-point device, wherein selection of the upstream pathway depends on status of association of the end-point device with the access point.

DETAILED DESCRIPTION

Figure 1:
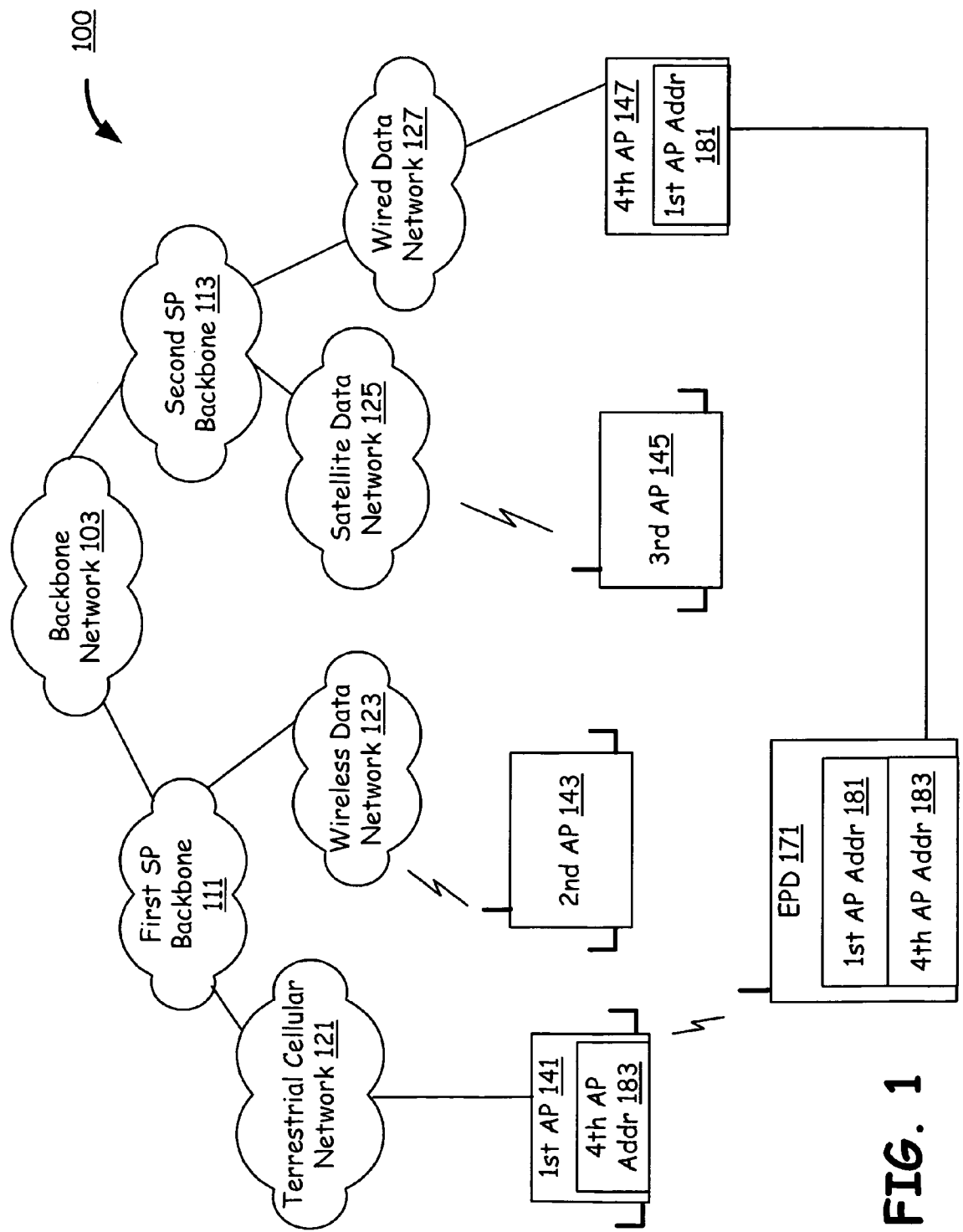
FIG. 1 is a schematic block diagram illustrating an end-point device in a communication infrastructure comprising a plurality of access points, a few of the plurality of access points having information necessary for indirect interaction with the end-point device via a backbone network in addition to direct interaction with the end-point device in accordance with various aspects of the present invention.

FIG. 1 is a schematic block diagram illustrating an end-point device 171 in a communication infrastructure 100 comprising a plurality of access points, 141, 143, 145 and 147, a few of the plurality of access points, 141 and 147 having information necessary for indirect interaction with the end-point device 171 via a backbone network 103 in addition to direct interaction with the end-point device 171. The EPD (end-point device) 171 is associated with a first AP (access point) 141 and a fourth AP 147. Association refers to the EPD 171 and a corresponding AP (i.e., any of the plurality of access points 141, 143, 145 and 147) exchanging respective network addresses and agreeing to exchange data henceforth using the exchanged network addresses. The EPD 171 receives a first AP address 181 from the first AP 141 when it associates with the first AP 141. The first AP 141 is uniquely identified in the communication infrastructure by the first AP address 181. The EPD 171 in addition receives a fourth AP address 183 that uniquely identifies the fourth AP 147 in the communication infrastructure, from the fourth AP 147 when it associates with the fourth AP 147. The EPD 171 sends the first AP address 181 and the fourth AP address 183 to the fourth AP 147 and the first AP 141 upon association with the fourth AP 147 and the first AP 141 respectively.

Each of the plurality of access points, 141, 143, 145, and 147 are transceivers. Each of them is adapted to communicate with at least one downstream EPD and an upstream data network. The upstream data network may be a circuit switched data network or a packet switched data network. In FIG. 1 the first AP 141 interacts with the EPD 171 and an upstream terrestrial cellular network 121 that typically is for example, and without limitation, a GSM network, GPRS network, CDMA network, WCDMA network, or EDGE network. A second AP 143 communicates with an upstream wireless data network 123 that typically is for example, and without limitation, an IEEE 802.11 network, Bluetooth network or IEEE 802.16 network. A third AP 145 from the plurality of APs belongs to a satellite data network 125, i.e., data flowing between an EPD with which the third AP 145 is associated and the satellite data network 125 passes through the third AP 145. The fourth AP 147 communicates with an upstream wired data network 127 that is a cable data network, fiber optic data network etc.

A first service provider maintains the terrestrial cellular network 121 and the wireless data network 123. A second service provider maintains the satellite data network and the wired data network 127. In another embodiment a single service provider maintains all the four data networks 121, 123, 125, and 127. In yet another embodiment four data networks 121, 123, 125, and 127 are maintained by four different service providers. Each of the four data networks 121, 123, 125 and 127 are communicatively coupled to the upstream backbone network 103 via respective service provider backbone infrastructure. "Downstream EPD" refers to an EPD that is located away from the backbone network 103 relative to an AP. "Upstream node" or "upstream network" refers to a node or a network that is located nearer to the backbone network 103 relative to an AP. There exist pathways between the plurality of APs, 141, 143, 145 and 147 via the upstream backbone network 103. However out of the plurality of APs, 141, 143, 145 and 147, the first AP 141 and the fourth AP 147 are able to send data to each other using each other's network addresses (i.e., 181 and 183), that has been delivered to first AP 141 and the fourth AP 147 by the EPD 171, via the backbone network 103.

The EPD 171 is adapted to handle packet data transmission and reception. Typical example of an EPD is a phone, PDA, television, PC, laptop, video game box, server etc. The EPD 171 comprises a first wireless network interface (not shown here) via which the EPD 171 communicates with the first AP 141 and a second wired network interface (not shown here)

via which the EPD 171 communicates with the fourth AP 147. Each of the plurality of APs 141, 143, 145 and 147 operates pursuant to four communicatively incompatible protocols. The EPD 171 exchanges data with the first AP 141 and the fourth AP 147 using a first protocol and a fourth protocol respectively.

The EPD 171 at an instance of time decides to disassociate from the first AP 141. The EPD 171 sends detachment notice and rule information to the first AP 141. The rule information comprises a rule for use of the fourth AP address 183 by the first AP 141. The first AP 141 in response to the detachment notice sends subsequent data packets (or units) destined for the EPD 171 to the fourth AP 147 via the backbone network 103 using the fourth AP address 183 in accordance with the rule information. The data packets (or units) may be generated by the first AP 141 or may have come to the first AP 141 from the upstream terrestrial cellular network 121. The first AP 141 being aware of unavailability of downstream direct path to the EPD 171 encapsulates the data packets (or units) with the fourth AP address 183 and sends them to the upstream terrestrial cellular network 121. The encapsulated data packets reach the fourth AP 147 via first SP (service provider) backbone infrastructure 111, the backbone network 103, the second SP (service provider) backbone infrastructure 113, and the wired data network 127. The fourth AP 147 determines that the data packets (or units) are destined for the EPD 171 and subsequently sends the data packets to the downstream EPD 171 via downstream direct communication link (which is a wired link) to the EPD 171 and using the fourth protocol. The EPD 171, in spite of being detached from the first AP 141, receives data packets from the first AP 141 via the fourth AP 147 and its second wired network interface (not shown here). The EPD 171 detaches from the first AP 141 typically when the EPD 171 moves away from service area of the first AP 141, the EPD 171 decides to put its first communication I/F (interface) to "sleep mode", QOS provided by the operative communication link between the EPD 171 and the first AP 141 (which is a wireless link) goes below acceptable level etc.

In a second embodiment the EPD 171 sends the rule information to the first AP 141 along with the fourth AP address 183. The rule information may further comprise a request for storing data packets in the first AP 141 and sending only network parameters to the EPD 171 via the backbone network 103 and the fourth AP 147 until the EPD 171 re-associates with the first AP 141. The first AP 141, in response to the detachment notice, uses the rule information and sends the network parameters to the EPD 171 via the fourth AP 147 using the fourth AP address 183 and stores the data packets destined for the EPD 171 in a memory of the first AP 141 until the EPD 171 re-associates with the first AP 141. The network parameters may typically include current traffic load on the first AP 141, current delay in the terrestrial cellular network 141, volume of data awaiting dispatch to the EPD 171, control signals necessary for re-association of the EPD 171 with the first AP 141 etc. The rule information may further comprise frequency at which the network parameters are to be sent to the EPD 171 via the fourth AP 147 until the EPD 171 re-associates with the first AP 141. The first AP 141 may be associated with one or more EPDs (not shown here) simultaneously. The first AP 141 sends the data packets destined for the EPD 171 directly to the EPD 171 via the downstream wireless link after the EPD 171 re-associates with the first AP 141.

In a third embodiment the EPD 171 is not adapted to send the fourth AP address 183 to the first AP 141 when the EPD 171 associates with the first AP 141 for first time. The rule information in such case comprises the fourth AP address 183 in addition to comprising the rule for use of the fourth AP address 183 by the first AP 141. The EPD 171 in the third embodiment is adapted to send the rule information to the first AP 141 at any time after association for the first time and prior to disassociation. The rule information thus need not accompany the detachment notice to the first AP 141.

In a fourth embodiment, the EPD 171 disassociates from the first AP 141 without informing the first AP 141 about the detachment. Such situation arises typically when the communication link between the EPD 171 and the first AP 141 fails abruptly or the EPD 171 is not adapted to send a detachment notice to the first AP 141 prior to detaching from the first AP 141. In the fourth embodiment, the first AP 141 learns that the EPD 171 is out of its reach when the first AP 141 fails to exchange data packets with the EPD 171 via the downstream wireless link. The first AP 141 subsequently retrieves network addresses of other APs with which the EPD 171 is associated from a memory of the first AP 141. The first AP 141 finds the fourth AP address 183 stored in the memory of the first AP 141. The first AP 141, instead of sending the data packets destined for the EPD 171 to the EPD 171 via the wireless link between the EPD 171 and the first AP 141, encapsulates the data packets with the fourth AP address 183 and delivers the encapsulated data packets to the fourth AP 147 via the upstream terrestrial cellular network 121 and the backbone network 103. The fourth AP 147 subsequently forwards the data packets to the EPD 171. The data packets travel from the first AP 141 to destination, i.e., the EPD 171 via an upstream pathway that comprises the backbone network 103 and the fourth AP 147. In the fourth embodiment the first AP 141 decides use of the fourth AP address 183 after the EPD 171 disassociates from the first AP 141.

The first AP 141 may have a plurality of network addresses of other APs to which the EPD 171 is currently associated stored in the memory of the first AP 141. The first AP 141, if adapted to work in multicast mode, chooses to send the data packets destined for the EPD 171 to all the other APs using respective network addresses when the EPD 171 detaches from the first AP 141. The first AP 141, if adapted to operate in unicast mode, sends the data packets to a first AP from the other APs via the backbone network 103. If the data packets fail to reach the EPD 171 then the first AP 141 sends the data packets again to a second AP from the other APs. The EPD 171 updates the first AP 141 about network addresses of the other APs to which the EPD 171 is currently associated as long as the EPD 171 remains associated with the first AP 141. In the fourth embodiment the first AP 141 decides use of the plurality of network addresses of other APs once the EPD 171 disassociates from the first AP 141.

In a variant of the fourth embodiment the EPD 171 sends the rule information to the first AP 141 when the EPD 171 associates with the first AP 141 for the first time. The first AP 141 performs action(s) in accordance with the rule information after the EPD 171 detaches from the first AP 141. In other words the EPD 171 directs what the first AP 141 will do when the EPD 171 disassociates from the first AP 141.

The rule information is different for different situations. For example and without limitation, the rule information leads the first AP 141 to request the EPD 171 for network addresses of other APs with which the EPD 171 is currently associated when the EPD 171 gracefully disassociates from the first AP 141 by informing the first AP 141 about intended detachment. The rule information leads the first AP 141 to retrieve the network addresses of the other APs from the memory of the first AP 141 and/or to request an upstream node for the network addresses of the other APs when the EPD 171 unexpectedly disassociates from the first AP 141.

In a fifth embodiment, the EPD 171 makes a non-graceful detachment from the first AP 141. Subsequently the EPD 171 sends the rule information to the first AP 141 via the fourth AP 147 and the backbone network 103. The rule information tells the first AP 141 to which other AP the first AP 141 is to send the data packets destined for the EPD 171. The rule information may in addition include a time duration for which the first AP 141 is to continue sending the data packets via the other AP. The rule information may comprise network addresses of a plurality of APs to which the EPD 171 is currently associated and a plurality of network parameters. The first AP 141 is adapted to use the plurality of network parameters to select one AP from the plurality of APs and send the data packets destined for the EPD 171 to the selected AP via the backbone network 103 henceforth. For example and without limitation the EPD 171 non-gracefully disassociates from the first AP 141 and subsequently associates with the second AP 143. The EPD 171 sends the rule information to the first AP 141 via the second AP 143. The rule information in this example comprises network address of the second AP 143 and the rule of using the network address of the second AP 143. The first AP 141, in response to the rule information received via the upstream backbone network 103, sends the data packets destined for the EPD 171 to the second AP 143 via the upstream backbone network 103 using the received network address of the second AP 143. The EPD 171 that receives the data packets from the first AP 141 using the first protocol when the EPD 171 is associated with the first AP 141 receives the data packets from the second AP 143 using a second protocol. The first protocol and the second protocol are communicatively incompatible.

In a sixth embodiment, the EPD 171 has a single communication I/F. The EPD 171 is associated with the first AP 141 via the single communication I/F. The EPD 171 moves to new location that is not serviced by the first AP 141 and gets detached from the first AP 141. The EPD 171, as an example, associates with the third AP 145 via the single communication I/F. A communication I/F is a combination of one or more of a software and hardware. The EPD 171 sends the rule information to the first AP 141 via the third AP 145. The rule information typically comprises network address of the third AP 145. The data packets destined for the EPD 171 comprise archived and/or real time multimedia information, for example, a television program, music video, picture, movie, video game, file, photo etc.

In a seventh embodiment the first AP 141 initiates detachment from the EPD 171. Such a situation may typically arise when QOS on the operative communication link between the EPD 171 and the first AP 141 goes below acceptable level, traffic load on the first AP 141 exceeds a permissible limit and the first AP 141 decides to service other node(s) instead of servicing the EPD 171, the EPD 171 remains in the "sleep mode" for a prolonged period of time. The first AP 141 retrieves the fourth AP address 183 from the memory of the first AP 141 and subsequently sends the rule information to the fourth AP 147 via the backbone network 103. The rule information comprises an identifier and a command directing the fourth AP 147 to forward all data encapsulated with the identifier to the EPD 171. The first AP 141 subsequently encapsulates the data packets destined for the EPD 171 with the identifier and sends the encapsulated data packets to the fourth AP 147 via the backbone network 103. The fourth AP 147 in accordance with the rule information (i.e., the command) forwards the data packets encapsulated with the identifier to the EPD 171. The EPD 171 in spite of being disassociated with the first AP 141 receives the data packets from the first AP 141 via the second AP 147. In the seventh embodiment the first AP 141 is originator of the rule information. The rule information in this case flows from the first AP 141 to the second AP 147 via the upstream backbone network 103.

The first AP 141 receives the fourth AP network address 183 from the EPD 171 directly via the operative communication link between the EPD 171 and the first AP 141 or via the upstream backbone network 103. The rule information, if generated by the EPD 171 and destined for the first AP 141 reaches the first AP 141 either via the operative communication link or via the upstream backbone network 103. The rule information generated by the first AP 141 and destined for the fourth AP 147 reaches the fourth AP 147 via the upstream backbone network 103. The first AP 141 may alternately select to send the rule information to the fourth AP 147 via the EPD 171 when the EPD 171 is associated with the first AP 141. The rule information generated by the first AP 141 in yet another embodiment comprises an instruction for the EPD 171 asking the EPD 171 to receive data packets from the fourth AP 147 after detaching from the first AP 141 thereby ensuring that the data packets destined for the EPD 171 that the first AP 141 will send to the fourth AP 147 after detachment of the EPD 171 from the first AP 141 reaches the EPD 171.

Figure 2:
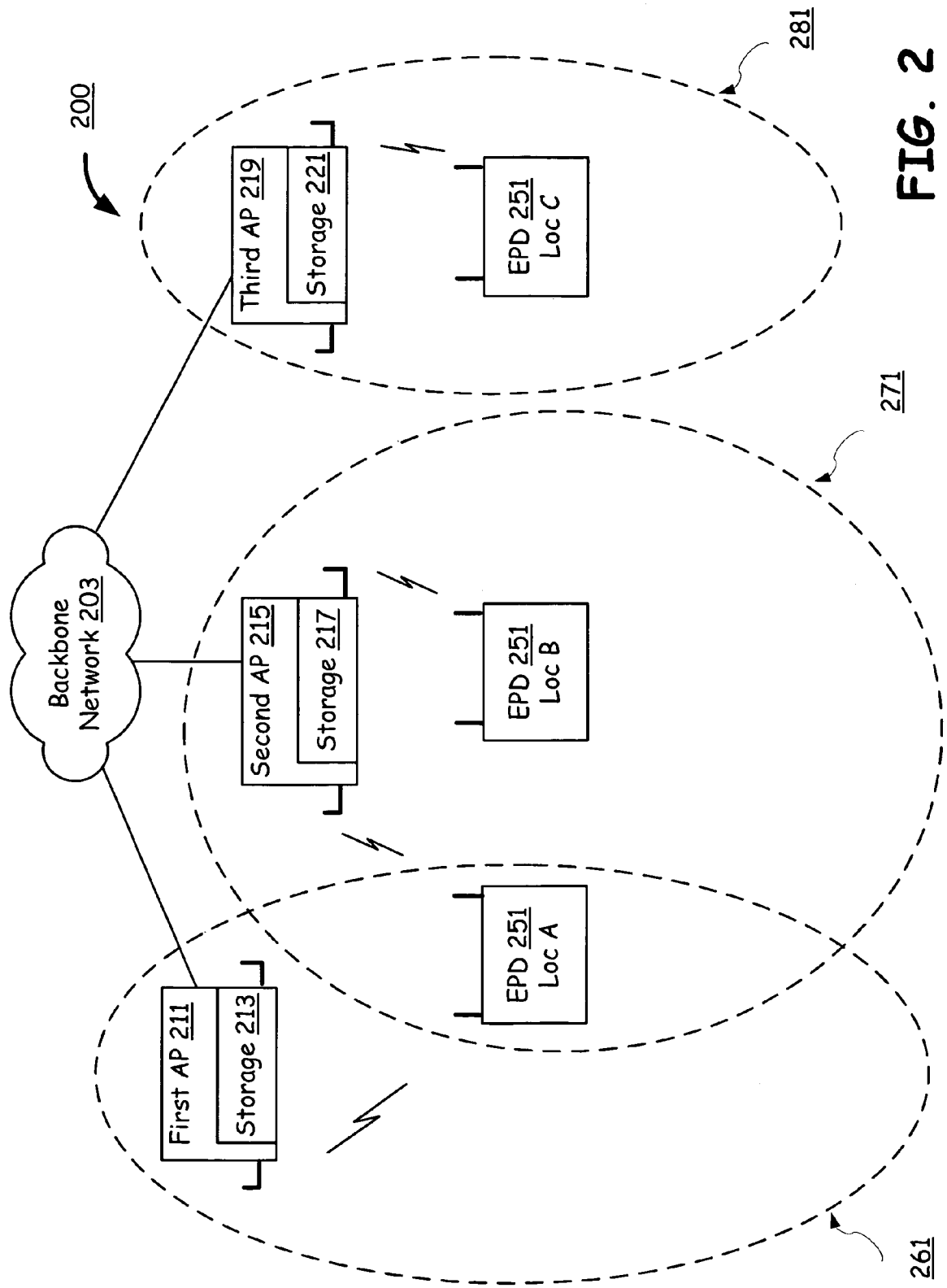
FIG. 2 is a schematic that shows interaction of a mobile end-point device with an access point even after the mobile end-point device moves out of coverage area of the access point.

FIG. 2 is a schematic that shows interaction of a mobile end-point device 251 with an access point 211 even after the mobile end-point device 251 moves out of coverage area of the access point 211. The access point (AP) 211, designated as a first AP, a second AP 215 and a third AP 219 are communicatively coupled to each other via an upstream backbone network 203. The first AP 211 covers a first region 261, the second AP 215 covers a second region 271, and the third AP 219 covers a third region 281. Different service providers maintain the first AP 211, the second AP 215, and the third AP 219. In another embodiment the first AP 211, the second AP 215 and the third AP 219 belong to same service provider network. The first AP 211, the second AP 215 and the third AP 219 use a first protocol, a second protocol and a third protocol to communicate with the upstream backbone network 203. Each of three APs, 211, 215 and 219 are adapted to communicate with more than one downstream end-point device (EPD) simultaneously. The three APs 211, 215 and 219 exchange data with downstream EPD(s) using the first protocol, the second protocol, and the third protocol respectively. The first protocol, the second protocol and the third protocol are either circuit switched data communication protocol or packet switched data communication protocol. In yet another embodiment the first protocol, the second protocol and the third protocol are communicatively compatible with each other.

An EPD 251 is at a location "A" at a given instant of time. The mobile EPD 251 is typically, for example and without limitation, a client device such as a laptop, PDA, phone etc. The location "A" is serviced both by the first AP 211 and the second AP 215. The EPD 251 has two communication interfaces (I/F). The EPD 251 associates with the first AP 211 via a first of the two communication I/Fs and associates with the second AP 215 via a second of the two communication I/Fs. The EPD 251 receives a network address of the first AP 211 from the first AP upon association. The EPD 251 sends the network address of the first AP 211 to the second AP 215. The second AP 215 stores the network address of the first AP 211 in a local storage system 217. Similarly the first AP 211 gets network address of the second AP 215 from the EPD 251 and stores it in a local storage system 213. The EPD 251 in addition sends first rule information to the first AP 211 and second rule information to the second AP 215. The first rule information comprises a rule for use of the network address of the second AP 215 by the first AP 211. Similarly the second rule information comprises a rule for use of the network address of the first AP 211 by the second AP 215. The first AP 411 and the second AP 215 store the first rule information and the second rule information respectively in their respective local storage systems 213 and 217.

At a second instant of time the EPD 251 moves to a location "B." The location "B" is serviced only by the second AP 215. The EPD 251 gracefully disassociates from the first AP 211 as the EPD 251 moves from the location "A" to the location "B" while remains associated with the second AP 215. The EPD 251 no longer exchanges data with the first AP 211 via the first communication I/F and using the first protocol, while continues to exchange data with the second AP 215 via the second communication I/F and using the second protocol. The EPD 251 sends detachment notice to the first AP 211 (or any of the three APs 211, 215 and 217) when the EPD 251 gracefully disassociates from the first AP 211 (or any of the three APs 211, 215 and 217). In response to the detachment notice the first AP 411 uses the first rule information as long as the EPD 251 remains detached (i.e., disassociated) from the first AP 211. The first rule information tells the first AP 211 to send any data destined for the EPD 251 via the upstream backbone network 203 and using the network address of the second AP 215. The first rule information further tells the first AP 211 to selectively send the data to the EPD 251 via the upstream backbone network 203. For example, the first AP 211 may be guided by the first rule information to send only high priority data such as protocol parameters to the EPD 251 via the upstream backbone network 203 as long as the EPD 251 remains detached from the first AP 211. The first AP 211 encapsulates the protocol parameters with the network address of the second AP 215 in accordance with the first rule information and transmits the encapsulated protocol parameters to the upstream backbone network 203 using the first protocol. The first AP 211 attaches an identifier corresponding to the EPD 251 with the encapsulated protocol parameters. The upstream backbone network 203 forwards the encapsulated protocol parameters to the second AP 215 using the second protocol. The second AP 215, using the identifier, determines that the encapsulated protocol parameters coming from the upstream backbone network 203 are destined for the EPD 251. The second AP 215 subsequently sends the received protocol parameters to the EPD 251. The EPD 251 that receives data from the first AP 211 via its first communication I/F while at the location "A", receives data (in this example the protocol parameters) from the first AP 211 via the second AP 215 and its second communication I/F while at the location "B". The protocol parameters may typically comprise information corresponding to the first protocol that the EPD 251 uses when it re-associates with the first AP 211 at a later instant of time. The EPD 251 receives data from the second AP 215 via the second communication I/F while at the location "A" and also at the location "B". The first communication I/F of the EPD 251 operates pursuant to the first protocol and the second communication I/F of the EPD 251 operates pursuant to the second protocol. In another embodiment, the EPD 251 sends the first rule information to the first AP 211 along with the detachment notice instead of sending the first rule information to the first AP 211 upon association with the first AP 211 for first time.

At a third instant of time the EPD 251 moves to a location "C." The location "C" is covered only by the third AP 219. The EPD 251 associates with the third AP 219 via its second communication I/F and exchanges data with the third AP 219 using the third protocol. The second communication I/F are adapted to operate pursuant to the third protocol also. The EPD 251 disassociates from the second AP 215 as the second AP 215 does not cover the location "C." The second AP 215 and the third AP 219 do not have a common coverage area. The second rule of information comprises the rule for use of the network address of the first AP 211 by the second AP 215. The EPD 251, even if adapted to undergo graceful detachment, in unable to tell the second AP 215 beforehand where the second AP 215 should send the data packets destined for the EPD 251 after the EPD 251 moves to a location covered by neither by the first AP 211 and nor by the second AP 215. The EPD 251 upon association with the third AP 219 receives network address of the third AP from the third AP 219. The EPD 251 while at location "C" desires to receive data from the first AP 211 and the second AP 215 even though the EPD 251 is out of range of the first AP 211 and the second AP 215. The EPD 251 sends the network address of the third AP to the first AP 211 and the second AP 215 via the third AP 219 and the upstream backbone network 203. The EPD 251 in addition sends third rule information to each of the first AP 211 and the second AP 215 via the third AP 219 and the backbone network 203. The third rule information comprises a rule for use of the network address of the third AP by the first AP 211 and the second AP 215. The first AP 211 being guided by the third rule information subsequently encapsulates a first data destined for the EPD 251 with the network address of the third AP 219 and sends the encapsulated first data to the upstream backbone network 203 using the first protocol. The encapsulated first data, by virtue of the network address of the third AP attached to it, gets routed by the backbone network 203 to the third AP 219. The third AP 219 sends the first data to the EPD 251 using the third protocol. The first data sent by the first AP 211 reaches the EPD 251 after traveling along an upstream pathway that runs through the backbone network 203 and a plurality of heterogeneous data networks (not shown here). The second AP 215 encapsulates a second data destined for the EPD 251 with the network address of the third AP and sends the encapsulated second data to the upstream backbone network 203 using the second protocol. The second data ultimately reaches the EPD 251 after traveling along another upstream pathway that runs through the backbone network 203 and the third AP 219. The EPD 251 receives the second data via its second communication I/F that operates pursuant to the third protocol as long as the EPD 251 remains associated with the third AP 219. The EPD 251 in spite of being detached from the first AP 211 and the second AP 215 continues to receive data from the first AP 211 and the second AP 215 via the third AP 219. In another embodiment the third rule information comprises a request for receiving network parameters associated with the first AP 211 and the second AP 215. The first AP 211 in response to the third rule information sends a first plurality of network parameters associated with the first AP 211 to the EPD 251 via the upstream backbone network 203 as long as the EPD 251 remains disassociated from the first AP 211. The second AP 215 similarly sends a second plurality of network parameters associated with the second AP 215 to the EPD 251 via the backbone network 203. The first plurality of network parameters and the second plurality of network parameters comprise one or more of delay, traffic load, interference level etc. in the network(s) managed by the first AP 211 and the second AP 215, protocol related parameters, for example and without limitation, version number of protocol, maximum supported data rate, bandwidth requirement, encryption requirement etc. The third rule information in addition comprises frequency parameter that defines how frequently the first data, the second data, the first plurality of network parameters and the second plurality of network parameters are to be sent to the EPD 251 via the upstream backbone network 203 and the third AP 219, priority rules that define type of data that is to be given higher priority while sending via the upstream backbone network 203, maximum permissible data transfer rate via the backbone network 203, an identifier to be used by the first AP 211 and the second AP 215 while sending data destined for the EPD 251 via the upstream backbone network 203 etc.

At a fourth instant of time the EPD 251 moves to the location "B." The EPD 251 disassociates from the third AP 219 and re-associates with the second AP 215. The EPD 251 starts receiving data from the second AP 215 directly via the second communication I/F that at the fourth instant of time operates pursuant to the second protocol. The EPD 251 sends a fourth rule information to the first AP 211 via the second AP 215 asking the first AP 211 to send data to it using the network address of the second AP henceforth. The EPD in addition sends a fifth rule information to the third AP 219 via the second AP 215 instructing the third AP 219 to send data to it using the network address of the second AP henceforth. The EPD 251 ensures that it receives data from all the three APs 211, 215 and 219 even though the EPD 251 is communicatively associated with the second AP 215 only.

In yet another embodiment the first AP generates rule on how each of three APs 211, 215, and 219 will send data to the EPD 251 when the EPD 251 goes out of range. For example and without limitation, the rule directs the first AP 211 to retrieve network addresses of other APS stored in the local storage system 213 when the first AP 211 discovers that the EPD 251 is out of its range. The EPD 251 is communicatively associated with at least one of the other APs even when the EPD 251 is detached from the first AP 211. The first AP 211 sends data destined for the EPD 251 to the at least one of the other APs using the corresponding network address and via the upstream backbone network 203 either in a multicast manner or in a unicast manner. The EPD 251 that is currently out of range of the first AP 211 receives data from the first AP 211 via the at least one of the other APs to which the EPD 251 is currently associated. In another variant of the embodiment, the rule directs the first AP 211 to send only control information to the EPD 251 via the upstream backbone network 203 until the EPD 251 re-associates with the first AP 211. The first AP 211 sends the rule to each of the second AP 215 and the third AP 219 either via the EPD 251 or via the upstream backbone network 203. The first AP 211 sends the rule to the EPD 251 when the EPD 251 remains associated with the first AP 211. The EPD 251 sends the rule to the second AP 215 and the third AP 219 at subsequent time instants. Alternately the first AP 211 sends the rule to the second AP 215 and the third AP 219 via the upstream backbone network 203 and using the network address of the second AP and the network address of the third AP respectively.

Figure 3:
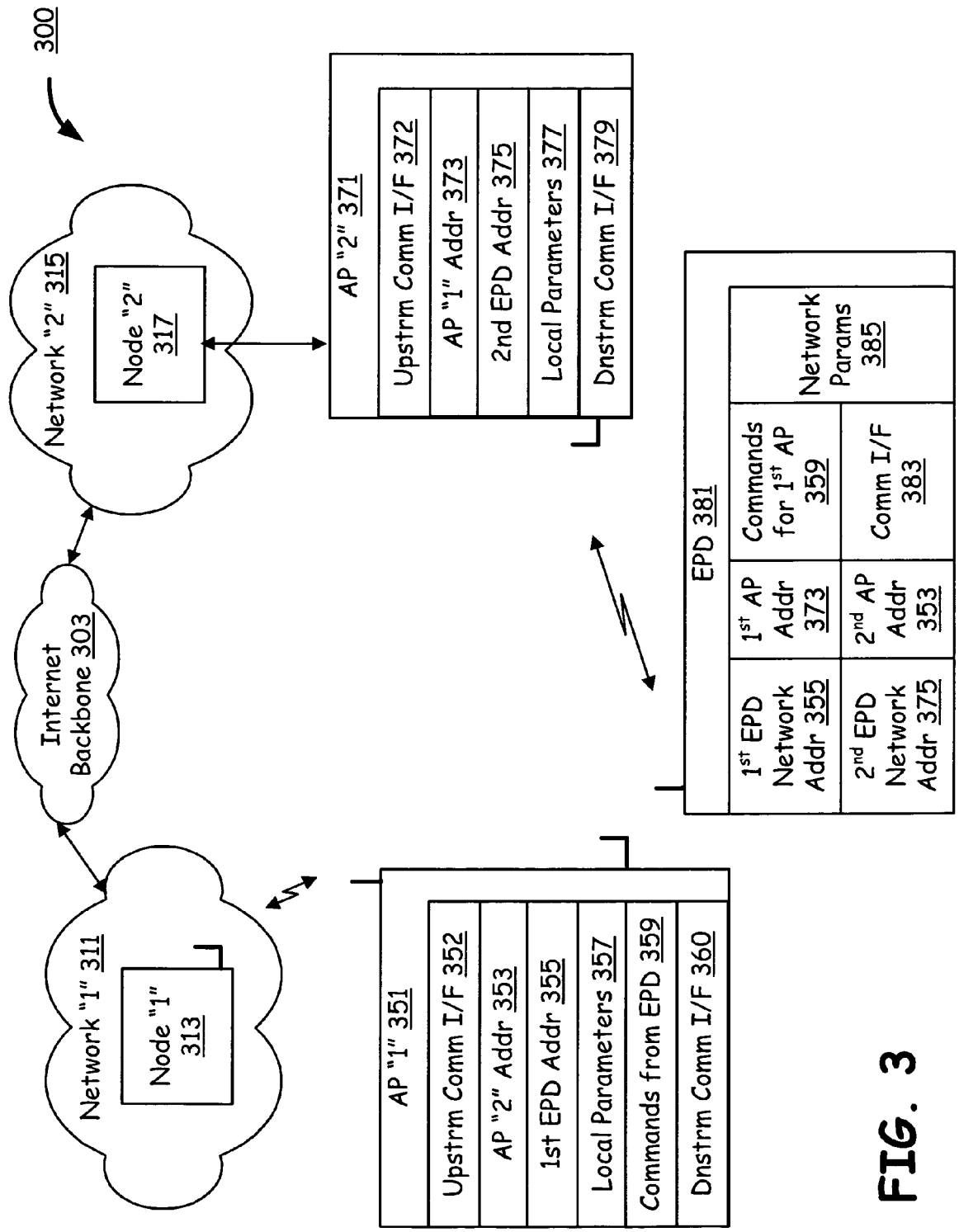
FIG. 3 is a schematic block diagram illustrating an end-point device with a single communication interface interacting directly with a first of two access points and interacting indirectly with a second of the two access points via the first of the two access points.

FIG. 3 is a schematic block diagram illustrating an end-point device 381 with a single communication interface interacting directly with a first of two access points (351 and 371) and interacting indirectly with a second of the two access points (351 and 371) via the first of the two access points. The EPD (end-point device) 381 is typically a mobile client device such as a mobile phone, laptop, PDA or a non-mobile client device such as a PC, video game box or server. The EPD 381 has a single communication I/F (interface) via which the EPD 381 is adapted to interact with one AP at a time. FIG. 300 is a communication infrastructure comprising an Internet backbone 303, a first network 311, a second network 315, a first AP 351, a second AP 371, and the EPD 381. The first network 311 and the second network 315 operate pursuant to identical protocol. The first network 311 and the second network 315 are both wireless data networks and are serviced by different network operators. In another embodiment the first network 311 and the second network 315 are serviced by same network operator.

The first network 311 comprises a plurality of nodes (not shown here) including a first node 313. The first node 313 is for example and without limitation a router, switch, hub, etc. The first AP 351 comprises an upstream communication I/F 352 via which the first AP 351 exchanges data with the first node 313. The first node 313 is in turn communicatively coupled to the Internet backbone 303 via the first network 311. The first AP 351 is thus communicatively connected with the Internet backbone 303 via the upstream communication I/F 352. The first AP 351 in addition comprises a downstream communication I/F 360 via which the first AP 351 interacts with the EPD 381.

The second AP 371 comprises an upstream communication I/F 372 via which the second AP 371 interacts with the second data network 315 and a downstream communication I/F 379 via which the second AP 371 communicates with the EPD 381. The EPD 381 has a single communication I/F 383. The communication I/F 383 operates pursuant to a wireless protocol that may typically be one of an IEEE 802.11 protocol, IEEE 802.16 protocol, Bluetooth, GSM, GPRS, EDGE, CDMA, WCDMA, cdma2000 etc. The EPD 381 associates with the first AP 351 at an instant of time. The EPD 381 receives a first AP address 373 from the first AP 351 during association. The first AP 351 uniquely identifies the EPD 381 using a first EPD network address 355. The EPD 381 is adapted to collect and store a plurality of network parameters 385 in its memory. The plurality of network parameters 385 typically comprise current quality of wireless link between the first AP 351 and the EPD 381, current bit rate supported by the wireless link, current traffic load on the first AP 351 etc. The EPD 381 measures and/or receives at least some of the plurality of network parameters 385 from the first AP 351. The first AP 351 has a plurality of local parameters 357 stored in memory of the first AP 351. The plurality of local parameters 357 are typically, for example and without limitation, current quality of communication link between the first AP 351 and the first node 313, current traffic load on the first AP 351, current traffic load on the first data network 311, current delay in the first data network 311 etc. The plurality of local parameters 357, in one embodiment, includes the plurality of network parameters 385.

The EPD 381 uses the communication I/F 383 to send and receive data from the first AP 351 and the first AP 351 uses the downstream communication I/F 360 to send and receive data from the EPD 381. At a second instant of time, the EPD 381 disassociates from the first AP 351. The first AP 351 controls the disassociation in this embodiment of the present invention. The first AP 351 instructs the EPD 381 to disassociate based on the plurality of local parameters 357. The first AP 351 typically initiates disassociation if the delay in the first data network 311 exceeds an allowable limit, the quality of the communication link between the first AP 351 and the first node 313 goes below an acceptable level etc. The first AP 351 sends rule information to the EPD 381 along with the instruction to disassociate via the downstream communication I/F 360. The rule information comprises a plurality of actions that the EPD 381 will perform in order to be able to receive data from the first AP 351 even after disassociating from the first AP 351.

The EPD 381 associates with the second AP 371 via the communication I/F 383 after disassociating from the first AP 351. The second AP 371 interacts with the EPD 381 via the downstream communication I/F 379 as long as the EPD 381 remains associated with the second AP 371. The second AP 371 assigns a second network address 375 to the EPD 381 and the second AP 371 identifies the EPD 381 using the second EPD network address 375. The second AP 371 is uniquely identified by the second AP address 353 in the communication infrastructure 300. The EPD 381, in accordance with the rule information received from the first AP 351 prior to disassociating from the first AP 351, sends the second AP address 353 to the first AP 351 via the second AP 371 and the Internet backbone 303. The EPD 381, as per the rule information, sends the plurality of network parameters 385 to the first AP 351 via the second AP 371. The EPD 381 encapsulates the second AP address 353 and the plurality of network parameters 385 with the first AP address 373. The second AP 371 receives the second AP address 353 and the plurality of network parameters 385 via the downstream communication I/F 379 forwards the second AP address 353 and the plurality of network parameters 385 to the second node 317 via the upstream communication I/F 372. The second AP address 353 and the plurality of network parameters 385, attached with the first AP address 373, get routed by the Internet backbone 303 and the first data network 311 to the first AP 351. The first AP 351 receives the second AP address 353 and the plurality of network parameters 385 via its upstream communication I/F 352. The rule information further sets how frequently the EPD 381 sends the plurality of network parameters 385 to the first AP 351 via the second AP 371 and which of the plurality of network parameters 385 the EPD 381 sends to the first AP 351 via the second AP 371. The first AP 351 uses the plurality of network parameters 385 to allow the EPD 381 to re-associate with the first AP 351.

The first AP 351 subsequently sends data destined for the EPD 381 to the EPD 381 via the Internet backbone 303 and the second AP 371 using the second AP address 353. The first AP 351 generates the data destined for the EPD 381 and/or receives the data from the upstream first node 313. The EPD 381 is detached from the first AP 351 and the first AP 351 is hence unable to send the data destined for the EPD 381 to the EPD 381 via its downstream communication I/F 360. The first AP 351 encapsulates the data with the second AP address 353 and sends the encapsulated data to the upstream first node 313 via its upstream communication I/F 352. The encapsulated data gets routed by the first data network 311, the Internet backbone 303 and the second data network 315 to the second AP 371. The second AP 371 receives the encapsulated data via its upstream communication I/F 372. The second AP 371 determines that the encapsulated data is destined for the EPD 381 and subsequently sends the data to the EPD 381 via its downstream communication I/F 379. The first AP 351 appends the data destined for the EPD 381 with an EPD identifier prior to sending the data to the second AP 371 via the Internet backbone 303. The EPD identifier helps the second AP 371 in determining destination of any data that the second AP 371 receives via its upstream communication I/F 372. The EPD identifier may be generated by the first AP 351 and sent to the EPD 381 along with the rule information. The EPD 381 in such case sends the EPD identifier to the second AP 371 after associating with the second AP 371. In another variant of the present invention the EPD 381 generates the EPD identifier and sends the EPD identifier to the first AP 251 directly or indirectly via the second AP 371 and also to the second AP 371 directly. The EPD 381, in spite of being detached form the first AP 351 at the second instant of time, receives the data from the first AP 351 indirectly i.e., via the second AP 371 to which the EPD 381 is currently associated.

In yet another embodiment the EPD 381 takes the decision to disassociate from the first AP 351 based on the plurality of network parameters 385. The EPD 381 informs the first AP 351 about intended disassociation. The EPD 381 decides to disassociate from the first AP 351 at the second instant of time because of, for example and without limitation, quality of service (QOS) provided by the first AP 351 going below accepted level, the EPD 381 moving to a location that is not serviced by the first AP 351, the EPD 381 hoping to receive better QOS from the second AP 371, the EPD 381 hoping to save battery power by switching from the first AP 351 to the second AP 371 etc. In the yet another embodiment, the rule information is generated by the EPD 381 and sent to the first AP 351 via the second AP 371 by the EPD 381 after associating with the second AP 371. The rule information in this case comprises the second AP address 353 and an instruction to the first AP 351 to send the plurality of local parameters 357 to the EPD 381 via the second AP 371 and using the second AP address 353. The rule information generated by the EPD 381 further comprises another instruction to the first AP 351 to store the data destined for the EPD 381 in the first AP 351 until the EPD 381 re-associates with the first AP 351. The rule information may alternately comprise a request to the first AP 351 to send the data destined for the EPD 381 to the EPD 381 via the second AP 371 and using the second AP address 353 until the EPD 381 re-associates with the first AP 351. The first AP 351 updates the plurality of local parameters 357 at regular intervals and sends the updated plurality of local parameters 357 to the EPD 351 via the upstream Internet backbone 303 and the second AP 371 using the second AP address 353. The EPD 381 uses the updated plurality of local parameters 357 to decide when to switch association from the second AP 371 to the first AP 351.

Figure 4:
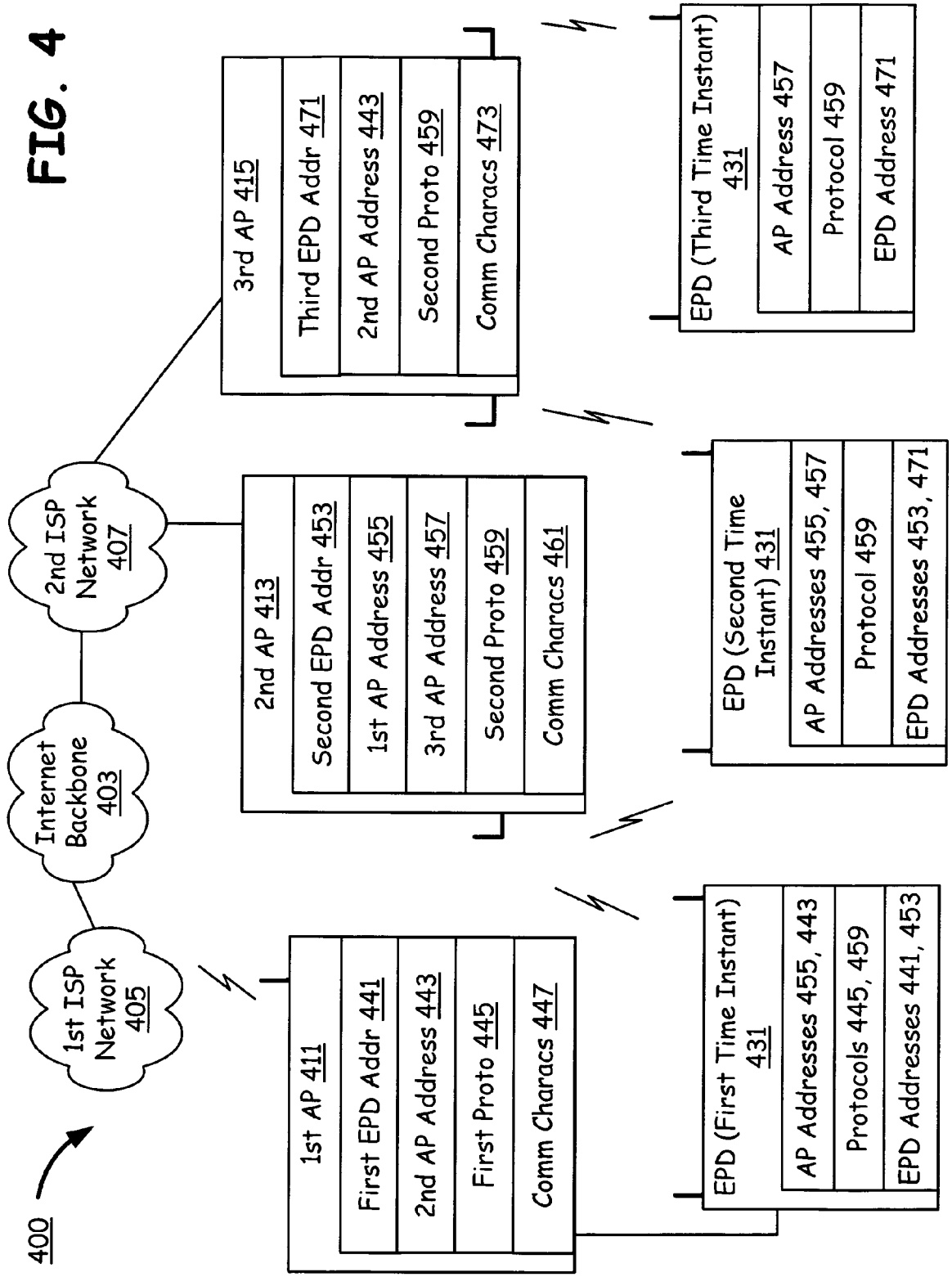
FIG. 4 is a schematic block diagram illustrating three access points of differing types cooperating each other to support communication with an end-point device that is not communicatively associated with the three access points simultaneously.

FIG. 4 is a schematic block diagram illustrating three access points 411, 413 and 415 of differing types cooperating each other to support communication with an end-point device 431 that is not communicatively associated with the three access points 411, 413 and 415 simultaneously. The EPD (end-point device) 431 at a first time instant is associated with a first AP (access point) 411 and a second AP 413 simultaneously. The first AP 411 belongs to a first Internet Service Provider (ISP) network 405 and operates according to a first protocol 445. The second AP 413 belongs to a second ISP network 407 and operates pursuant to a second protocol 459 that are communicatively incompatible with the first protocol 445. The first ISP network 405 and the second ISP network 407 are communicatively coupled to each other via an Internet backbone 403. There exists at least one upstream pathway from the first AP 411 to the second AP 413 via the Internet backbone 403. Each of the first AP 411 and the second AP 413 has at least one upstream communication I/F (interface) via which they (i.e., 411 and 413) communicate with their respective ISP networks (i.e., 405 and 407). The first AP 411 and the second AP 413 use their respective upstream communication I/Fs (not shown here) to exchange data via the at least one upstream pathway that runs through the Internet backbone 403.

Each of the first AP 411 and the second AP 413 has at least one downstream communication I/F (not shown here) via which they (i.e., 411 and 413) communicate with the downstream EPD 431. The first AP 411 and the second AP 413 use their respective downstream communication I/Fs to send and receive data from the EPD 431 when they remain associated with the EPD 431. Association of the first AP 411 with the EPD 431 refers to the first AP 411 assigning a first EPD address 441 to the EPD 431 and sending a first AP address 455 to the EPD 431. The first AP 411 and the EPD 431 exchange data using the first EPD address 441 and the first AP address 455. The first AP address 455 uniquely identifies the first AP 411. Association of the second AP 413 with the EPD 431 leads to assignment of a second EPD address 453 to the EPD 431 and the EPD 431 receiving a second AP address 443 from the second AP 413. The second AP address 443 uniquely identifies the second AP 413.

The EPD 431 upon association with the first AP 411 sends the first AP address 455 to other APs to which the EPD 431 is currently associated. Similarly the EPD 431 upon association with the second AP 413 sends the second AP address 443 to the other APs to which the EPD 431 is currently associated. At the first instant of time the first AP 411 has the second AP address 443 and the second AP 413 has the first AP address 455. Each of the first AP 411 and the second AP 413 has respective communication characteristics 447 and 461 stored in respective local memories. The communication characteristics 447 typically comprise first protocol version number, bit rate supported by the first protocol 445, power requirement of the first protocol 445, current traffic load on the first AP 411, current delay in the first ISP network 405, current link quality of wired communication link between the EPD 431 and the first AP 411 etc. The communication characteristics 461 typically comprise second protocol version number, bit rate supported by the second protocol 459, power requirement of the second protocol 459, current traffic load on the second AP 413, delay in the second ISP network 407, link quality of wireless communication link between the EPD 431 and the second AP 413 etc.

The EPD 431 disassociates from the first AP 411 at a second instant of time. The de-association occurs because, for example and without limitation, the wired communication link between the EPD 431 and the first AP 411 breaks, the EPD 431 moves to a location where the wired communication link is not available, the first AP 411 forces disassociation based on the communication characteristics 447 etc. The first AP 411 desires to send data to the EPD 431 at the second instant of time. The data comprises multimedia information such as audio, video game, television program, music video, file, picture etc. In another embodiment the data comprises control signal and network information only. The EPD 431 needs the network information and the control signal to re-associate with the first AP 411 at a later instant of time. The first AP 411 encapsulates the data i.e., one or more combination of the multimedia information, the control signal and the network information with the second AP address 443 and sends the encapsulated data to the first ISP network 405 via its upstream communication I/F (not shown here). The encapsulated data in addition contains a destination identifier. The encapsulated data gets routed to the second AP 413 after traveling via the Internet backbone 403 and the second ISP network 407. The second AP 413 removes the second AP address 443 from the encapsulated data and determines from the destination identifier that the data is destined for the EPD 431. The second AP 413 sends the data to the EPD 431 via its downstream communication I/F (not shown here) and using the second EPD address 453. The EPD 431 thus receives the data from the first AP 411 even though the EPD 431 is detached from the first AP 411 at the second instant of time. The data reaches the EPD 431 after traveling via two different ISP networks 405 and 407.

In yet another embodiment the EPD 431 chooses to send the second AP address 443 to the first AP 411 just before disassociating from the first AP 411. The EPD 431 in the yet another embodiment does not send the first AP address 455 to the second AP 413. Thus the EPD 413 is adapted to selectively send one AP address to another. The EPD 431 is in addition adapted to choose when to send one AP address to another.

The EPD 431 associates with a third AP 415 at the second instant of time. The second AP 413 and the third AP 415 belong to the second ISP network 407 and both operate pursuant to the second protocol 459. The second AP 413 gets third AP address 457 and the third AP 415 gets the second AP address 443 from the EPD 431 by way of their association with the EPD 431. Alternately the second AP 413 and the third AP 415 get each other's unique address from a server of the second ISP network 407. The third AP address 457 flows form the third AP 415 to the second AP 413 via the second ISP network 407. Such situation may not typically arise if the second AP 413 and the third AP 415 belong to different service provider networks.

The EPD 431 disassociates from the second AP 413 and remains associated with the third AP 415 only at a third instant of time. The first AP 411 uses the second AP address 443 to send the data destined for the EPD 431 via the Internet backbone 403 from the second instant of time onwards. The second AP 413 continues receiving the data destined for the EPD 431 from the first AP 411 after the third instant of time i.e., after the EPD 431 detaches from the second AP 413. The second AP 413 encapsulates the data received from the first AP 411 with the third AP address 457 and sends the encapsulated data to the second ISP network 407 via its upstream communication I/F (not shown here). The second ISP network 407 delivers the encapsulated data to the third AP 415. The third AP 415 receives the encapsulated data via its upstream communication I/F (not shown here), removes the third AP address 457, determines that the data is destined for the EPD 431 and sends the data to the EPD 431 via its downstream communication I/F (not shown here). The EPD 431 continues receiving the data from the first AP 411 even after disassociating from the first AP 411 and the second AP 413. The first AP 411 even being unaware of network address of AP(s) with which the EPD 431 is communicatively associated from the third instant of time onwards, is able to send the data destined for the EPD 431 to the EPD 431 with cooperation from the second AP 413.

In the yet another embodiment the EPD 431 is adapted to send the third AP address 457 to the first AP 411 via the second AP 413 prior to detaching from the second AP 413. In such case the first AP 411 uses the third AP address 457 to send the data destined for the EPD 431 to the EPD 431 via the Internet backbone 403 and the third AP 415.

Figure 5:
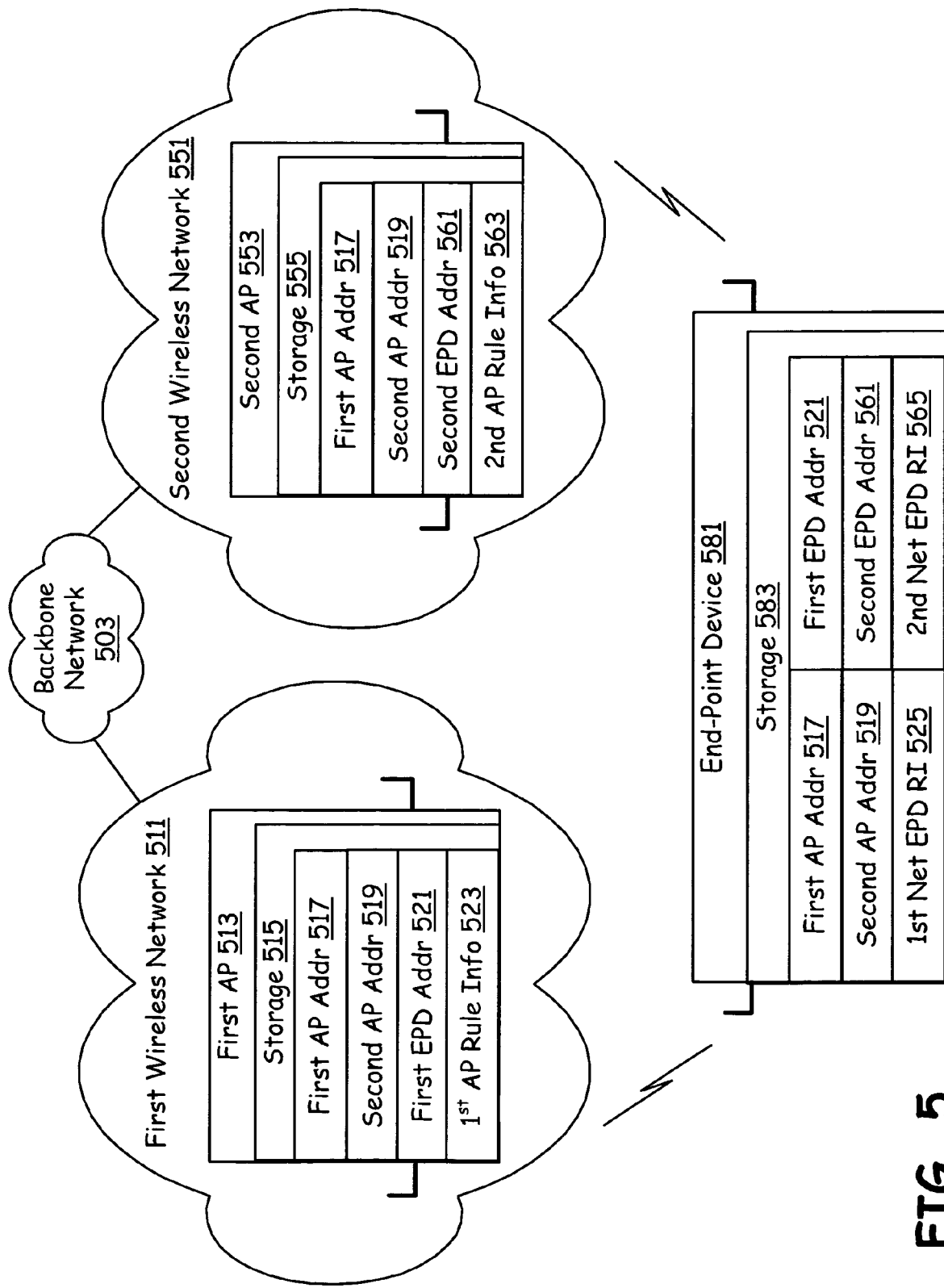
FIG. 5 is a schematic block diagram illustrating exchange of network addresses and rule information between a first access point and a second access point of differing types to support communication with an end-point device.

FIG. 5 is a schematic block diagram illustrating exchange of network addresses and rule information between a first access point 513 and a second access point 553 of differing types to support communication with an end-point device 581. A first wireless network 511 operates pursuant to a first wireless protocol and a second wireless network 551 operates pursuant to a second wireless protocol that is communicatively incompatible with the first wireless protocol. The first wireless network 511 and the second wireless network 551 are one of a, for example and without limitation, GSM network, GPRS network, CDMA network, WCDMA network, satellite network, cdma2000 network, Bluetooth network, IEEE802.11 network and WiMax network. The first wireless network 511 is a network of a first plurality of nodes. The first access point (AP) 513 is one of the first plurality of nodes. The second wireless network 551 is a network of a second plurality of nodes where the second AP 5513 is one the second plurality of nodes. The first AP 513 comprises a first upstream communication interface (I/F) (not shown here) via which the first AP 513 exchanges data packets with at least one of the first plurality of nodes belonging to the first wireless network 511. The first upstream communication I/F may be a wireless or a wired I/F. The second AP 553 comprises a second upstream communication interface (I/F) (not shown here) via which the second AP 553 exchanges data packets with at least one of the second plurality of nodes belonging to the second wireless network 551. The second upstream communication I/F may be a wireless or a wired I/F. The first wireless network 511 is communicatively coupled to the second wireless network 551 via a backbone network 503. Thus there exists at least one communication pathway between the first upstream I/F of the first AP 513 and the second upstream I/F of the second AP 553 via the backbone network 503.

The first AP 513 comprises a first wireless downstream communication I/F (not shown here) via which the first AP 513 exchanges data packets with the end-point device (EPD) 581 when the EPD 581 is associated with the first AP 513. The second AP 553 comprises a second wireless downstream communication I/F (not shown here) via which the second AP 553 exchanges data packets with the EPD 581 when the EPD 581 is associated with the second AP 553. The first AP 513 uses a first EPD address 521 for sending the data packets to the EPD 581 via the first downstream communication I/F. The EPD 581 uses a first AP address 513 for sending data packets to the first AP 513 directly, i.e., via the first wireless network 511. The second AP 553 and the EPD 581 use a second EPD 561 and a second AP address 519 to exchange data packets between them via the second downstream communication I/F when the EPD 581 is associated with the second AP 553. The EPD 581 interacts with the first wireless network 511 via the first AP 513 and interacts with the second wireless network 551 via the second AP 553.

In an exemplary case, the EPD 581 is associated with the first AP 513 and the second AP 553 simultaneously. The first AP 513 instructs the EPD 581 to send the first AP address 517 to other APs with which the EPD 581 is currently associated. The first AP 513 in addition instructs the EPD 581 to send network address(es) of the other AP(s) to which the EPD 581 is currently associated to the first AP 513. The EPD 581 in response to the instructions from the first AP 513 sends the second AP address 519 to the first AP 513 via the first downstream communication I/F. The EPD 581 further sends the first AP address 517 to the second AP 553. The first AP 513 and the second AP 553 exchange respective network addresses via the EPD 581 to which the first AP 513 and the second AP 553 are simultaneously associated.

In another embodiment, the EPD 581 decides when to send the first AP address 517 to the second AP 553 and the second AP address 519 to the first AP 513. The EPD 581 may send the first AP address 517 to the second AP 553 after association with the second AP 553 for first time or when the EPD 581 desires to receive data packets from the first AP 513 (or the first wireless network 511) via the second AP 553. The EPD 581 desires to receive data packets from the first wireless network 511 via the second AP 553 typically when the EPD 581 has detached from the first wireless network 511 i.e., the first AP 513.

The first AP 513 directs to deliver second AP rule information 563 to the second AP 553 in addition to causing to deliver the first AP address 517 to the second AP 553. The second AP rule information 563 comprises a rule for use of the first AP address 517 by the second AP 553. The first AP 513 may direct delivery of the second AP rule information 563 to the second AP 553 via the EPD 581 when the EPD 581 is associated with the first AP 513 and the second AP 553 simultaneously. The second AP rule information 563 travels from source node i.e., the first AP 513 to destination node i.e., the second AP 553 via the first downstream communication I/F of the first AP 513, the EPD 581 and the second downstream communication I/F of the second AP 553. The first AP 513 may alternately trigger delivery of the second AP rule information 563 to the second AP 553 via the backbone network 503. The first AP 513 uses the second AP address 519 to cause delivery via the backbone network 503. The first AP 513 directs delivery via the backbone network 503 typically if the EPD 581 is detached from the first AP 513, traffic load on the first downstream communication I/F exceeds permissible limit, the EPD 581 goes to "sleep mode" etc. The second AP rule information 563 in such case travels from the first AP 513 to the second AP 553 via the first upstream communication I/F of the first AP 513, the backbone network 503 and the second upstream communication I/F of the second AP 553.

The second AP 553 in addition directs delivery of first AP rule information 523 to the first AP 513 either via the EPD 581 or via the backbone network 503. The second AP 553 chooses a pathway for delivery of the first AP rule information 523 to the first AP 513 either independently or jointly with the first AP 513.

The first AP rule information 523 comprises a rule for use of the second AP address 519 by the first AP 513. The rule includes when and for how long the first AP 513 will use the second AP address 519 for delivering data packets to the EPD 581. The first AP rule information 523 further comprises a plurality of parameters. The first AP 513 is instructed to execute actions in accordance with the plurality of parameters. As a way of example and without limitation, the plurality of parameters comprises maximum data rate supported by the second wireless network 551. The rule for use of the second AP address 519 says that the first AP 513 should use the second AP address 519 to send the data packets destined for the EPD 581 to the backbone network 503 at a rate less than the maximum data rate and only when the EPD 581 is unreachable via the first downstream communication I/F of the first AP 513. The plurality of parameters, for example, may further comprise current traffic load in the second wireless network 551 and a maximum allowable load value. The rule in such case says that the first AP 513 should use the second AP address 519 to send the data packets destined for the EPD 581 to the backbone network 503 only if the current traffic load is less than the maximum allowable load value. The second AP 553 in the above case updates the first AP 513 about the current traffic load in the second wireless network 551 by sending the plurality of parameters to the first AP 513 regularly either via the EPD 581 or via the backbone network 503. The second AP rule information 563 similarly comprises a rule for use of the second AP address 519 by the first AP 513.

In another embodiment the EPD 581 is originator of the first AP rule information 523 and the second AP rule information 563. As a way of example and without limitation, the EPD 581 that was associated with both the first AP 513 and the second AP 553 disassociates from the first AP 513 at an instant of time. The EPD 581 desires to receive the data packets from the first wireless network 511 via currently associated AP i.e., the second AP 553. Towards this end, the EPD 581 sends the first AP rule information 523 to the first AP 513 via the second AP 553 and the backbone network 503. The first AP rule information 523 directs the first AP 513 to encapsulate the data packets destined for the EPD 581 with the second AP address 519 and send the encapsulated data packets to the backbone network 203 via the first upstream communication I/F (not shown here) henceforth. The first AP 513 executes actions in accordance with the first AP rule information 523 received from the EPD 581. The data packets from the first wireless network 511 reach the EPD 581 that is disassociated from the first wireless network 511 via the second wireless network 551 with which the EPD 581 is currently associated.

The first AP 513 in addition sends first network EPD rule information 525 to the EPD 581 either directly via the first downstream communication I/F (not shown here) or via the upstream backbone network 503 and the second AP 553. The first network EPD rule information 525 comprises a rule for sending network address(s) of the other AP(s) to which the EPD 581 is currently associated to the first AP 513. As a way of example the first network EPD rule information 525 further comprises a plurality of network parameters and a rule for disassociating from the first AP 513 using the plurality of network parameters. The first AP 513 chooses to send updated network parameters to the EPD 581 at regular intervals. The second AP 553 sends second network EPD rule information 565 to the EPD 581 either directly via the second downstream communication I/F (not shown here) or via the upstream backbone network 503 and the first AP 513. The second network EPD rule information 565, for example, comprises a rule for sending status of communication I/F(s) of the EPD to the second AP 553 at regular intervals either directly via the second downstream communication I/F (not shown here) or indirectly via the first AP 513 and the backbone network 503.

The first AP 513 and the second AP 553 exchange respective network addresses (517 and 519) via the EPD 581 in order to serve the EPD 581 even if the EPD 581 disassociates from any one of the first AP 513 and the second AP 553. Any one or both of the first AP 513 and the second AP 553 delivers rule information to another of the first AP 513 and the second AP 553 via either the EPD 581 or the upstream backbone network 503 depending on association status of the EPD 581 with the first AP 513 and the second AP 553. The rule information may originate in any one or both of the first AP 513 and the second AP 553 or in the EPD 581. Any one or both of the first AP 513 and the second AP 553 sends EPD rule information to the EPD 581 either directly or via the upstream backbone network 503.

Figure 6:
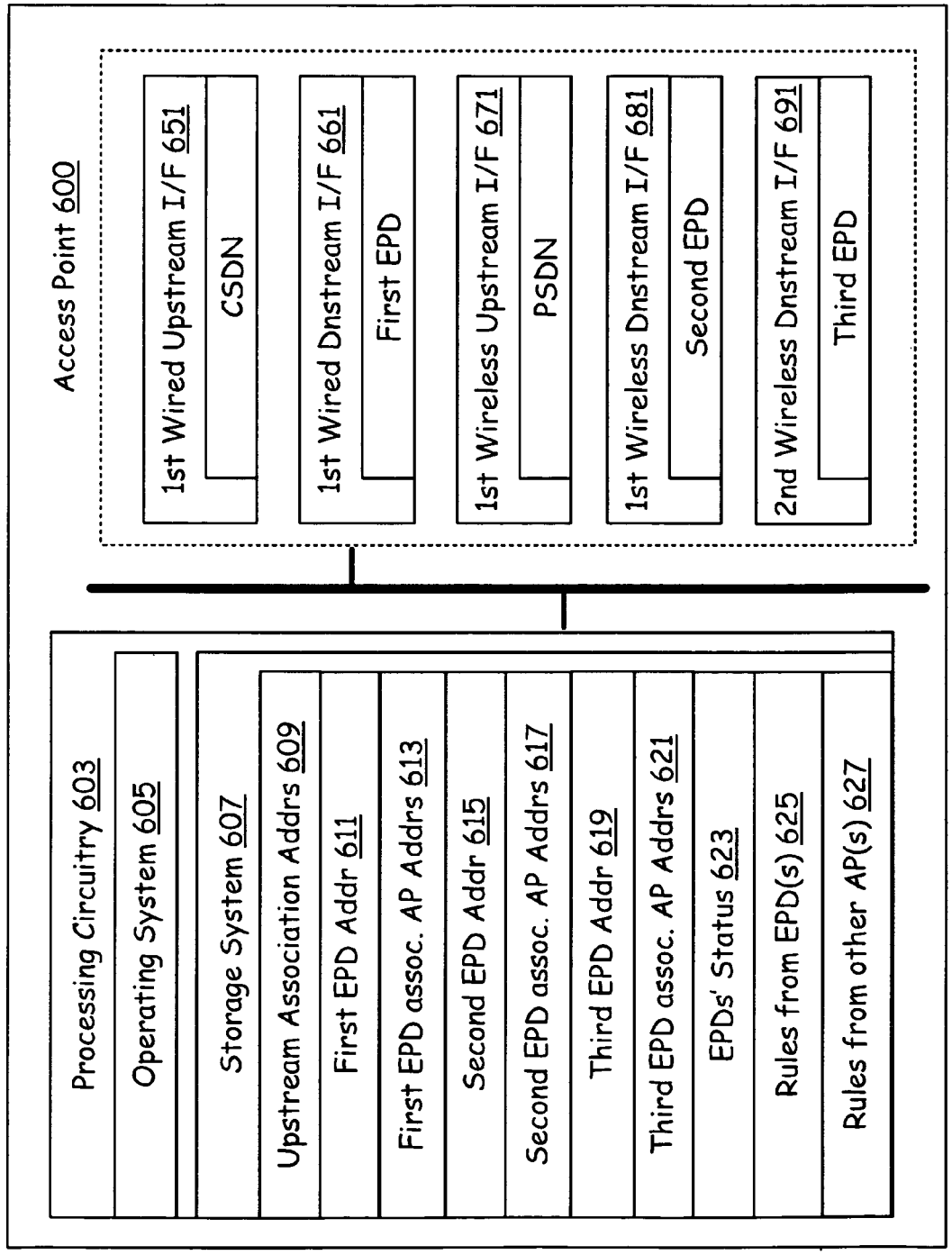
FIG. 6 is a schematic block diagram illustrating a plurality of components of an access point that supports data communication to a detached end-point device via an upstream backbone network.

FIG. 6 is a schematic block diagram illustrating a plurality of components of an access point 600 that supports data communication to a detached end-point device via an upstream backbone network. The AP (access point) 600 is adapted to communicatively couple to a circuit switched data network (CSDN) via a first wired upstream communication I/F 651. The AP 600 is in addition adapted to communicatively couple to a packet switched data network (PSDN) via a first wireless upstream communication I/F 671. The AP 600 comprises three downstream communication I/Fs, a first wired downstream I/F 661 via which the AP 600 associates with a first end-point device (EPD), a first wireless downstream I/F 681 via which the AP 600 associates with a second EPD, a second wireless downstream I/F 691 via which the AP 600 associates with a third EPD. Each of three downstream EPDs, the first EPD, the second EPD and the third EPD is a PC, laptop, server, PDA, video game box, phone etc. The three EPDs are source of data and/or destination of data. The AP 600 supports bidirectional communication with the three downstream EPDs and the upstream CSDN and the upstream PSDN. The AP 600 comprises a processing circuitry 603 and an operating system 605. The AP 600 further comprises a storage system 607 that stores a first EPD address 611, a second EPD address 615 and a third EPD address 619. The AP 600 uses EPD addresses 611, 615 and 619 to communicate with the three downstream EPDs. Each of the three EPDs may be communicatively associated with AP(s) other than the AP 600 simultaneously. The AP 600 receives network addresses of other AP(s) from the three EPDs. As a way of example and without limitation, the first EPD is communicatively associated with a first plurality of APs in addition to the AP 600. The first EPD sends network addresses 613 of the first plurality of APs to the AP 600. Similarly the AP 600 receives network addresses 617 of a second plurality of APs with which the second EPD is communicatively associated and network addresses 621 of a third plurality of APs with which the third EPD is communicatively associated. The AP 600 stores network addresses 609 of two upstream nodes to which the AP 600 is communicatively connected via upstream I/Fs 651 and 671. A first of the two upstream nodes belong to the CSDN and a second of the two upstream nodes belong to the PSDN. The AP 600 in addition stores status 623, of the three downstream EPDs and a first plurality of rules 625 from at least one of the three downstream EPDs and a second plurality of rules 627 from other AP(s).

The PSDN and the CSDN to which the AP 600 is communicatively connected via the upstream communication I/Fs 671 and 651 respectively are communicatively coupled to each other via the upstream backbone network. The first EPD to which the AP 600 remains communicatively coupled detaches from the AP 600 at an instant of time. The first EPD is adapted to communicate detachment notice to the AP 600. The AP 600 responds to the detachment notice by executing action(s) as per the first plurality of rules 625 and the second plurality of rules 627. The AP 600 uses one from the network addresses 613 of the first plurality of APs to send data to the first EPD from the instant of time onwards where the one from the network addresses 613 of the first plurality of APs is chosen in accordance with one or both of the first plurality of rules 625 and the second plurality of rules 627. The AP 600 sends the data via one of the upstream communication I/Fs 671 and 651, to the upstream backbone network. The upstream backbone network routes the data that is encapsulated with the one of the network addresses 613 of the first plurality of APs, to corresponding AP from the first plurality of APs. The first EPD is currently associated with the corresponding AP from the first plurality of APs. The corresponding AP sends the data to the first EPD. The AP 600 delivers the data to the destination, i.e., the first EPD that is detached from the AP 600 and thus not reachable via the first wired downstream I/F 661, via one of the upstream communication I/Fs 671 and 651.

Type of data the AP 600 sends to the first EPD (or any detached EPD that was associated with the AP 600 earlier) when the first EPD is detached from the AP 600 is determined by one or combination of the AP 600, the first EPD and the first plurality of APs to which the first EPD is communicatively associated. The first plurality of rules 625 comprises a rule that directs the AP 600 to send a plurality of network parameters to the first EPD via the upstream backbone network after detachment and queue up multimedia data in the AP 600 for future transmission. The second plurality of rules 627 comprises a rule that directs the AP 600 to send only high priority data to the first EPD via the upstream backbone network after detachment. The first plurality of rules 625 further comprises a rule that sets how frequently the AP 600 is to send data to the first EPD via the upstream backbone network after detachment. As an example the first plurality of rules directs the AP 600 to exchange data with the first EPD where the data is one or more of multimedia data, the plurality of network parameters such as protocol information, pathway performance information via the upstream backbone network once in every 5 minutes after detachment. The first plurality of rules 625 further comprises a rule for resume sending the data destined for the first EPD to the first EPD via the first wired downstream I/F 661 after the AP 600 receives a re-attachment notice from the first EPD via the upstream backbone network.

The AP 600 if adapted to work in multicasting mode, instead of sending the data to the first EPD using the one of the network addresses 613 of the first plurality of APs, sends the data using each of the network addresses 613 of the first plurality of APs. In unicast mode of operation, the data sent by the AP 600 does not reach the first EPD if the corresponding AP is currently detached from the first EPD. In multicast mode, the data sent by the AP 600 does not reach the first EPD if each of the first plurality of APs is currently detached from the first EPD. The second plurality of rules 627 comprises a rule permitting the AP 600 to operate in the multicasting mode.

In another variant of the present invention, the first EPD does not communicate the detachment notice to the AP 600. The first plurality of rules 625 comprising a rule for use of the network addresses 613 by the AP 600 when the first EPD detaches from the AP 600 abruptly. The AP 600 retrieves the network addresses 613 of the first plurality of APs from the storage system 607 and uses one or more addresses from the network addresses 613 to send the data to the first EPD via the upstream backbone network after detachment in accordance with the first plurality of rules 625.

Figure 7:
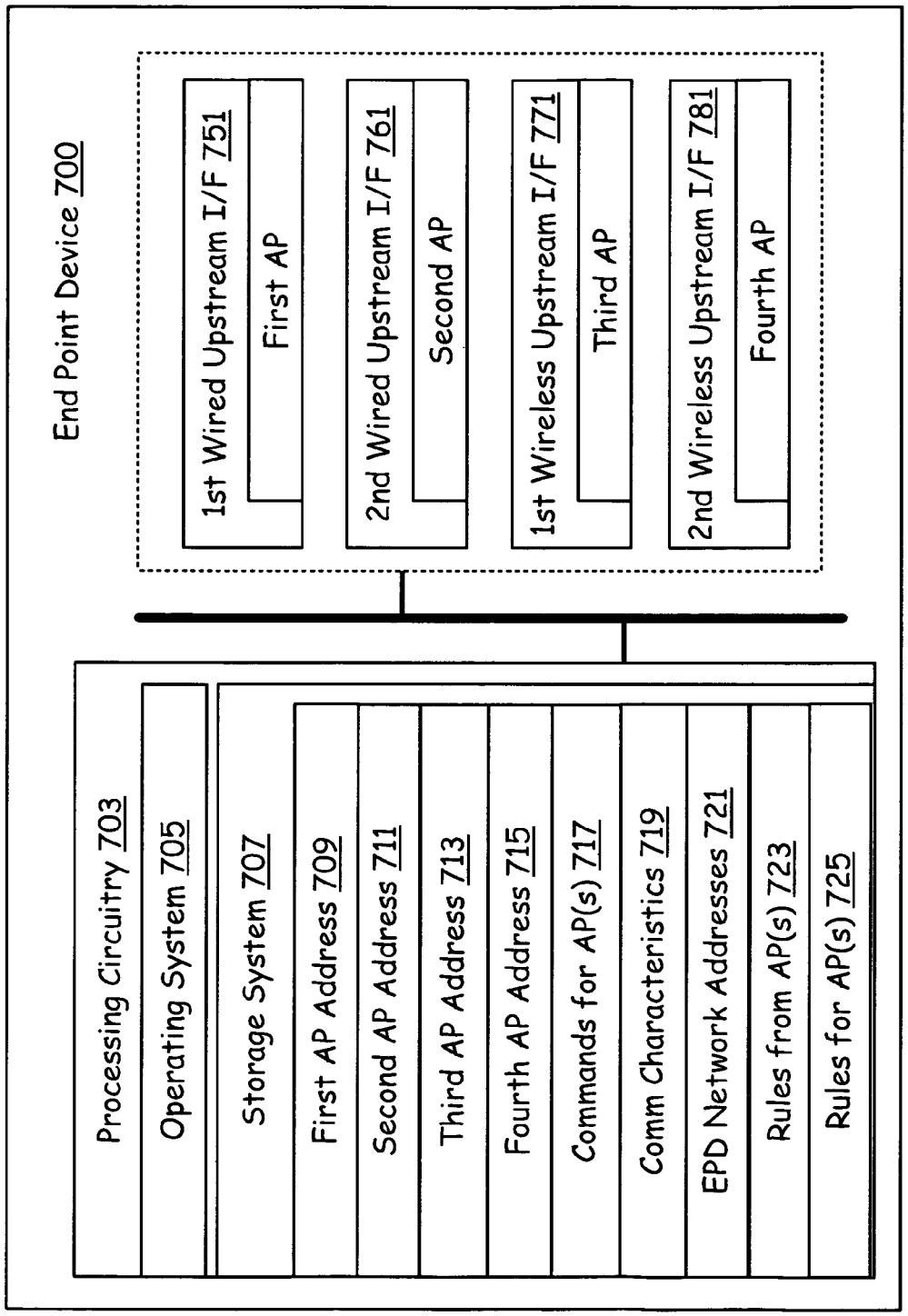
FIG. 7 is a schematic block diagram illustrating a plurality of components of an end-point device that supports data communication with an access point after detaching from the access point.

FIG. 7 is a schematic block diagram illustrating a plurality of components of an end-point device 700 that supports data communication with an access point after detaching from the access point. The EPD (end-point device) 700 has four upstream communication I/Fs, a first wired upstream I/F 751 via which the EPD 700 is communicatively associated with a first AP, a second wired upstream I/F 761 via which the EPD 700 is communicatively associated with a second AP, a first wireless upstream I/F 771 via which the EPD 700 is communicatively associated with a third AP and a second wireless upstream I/F 781 via which the EPD 700 is communicatively associated with a fourth AP. The EPD 700 is adapted to support wired data communication, that is typically a cable data communication, fiber data communication etc. and to support wireless data communication, that is typically communication using Bluetooth, IEEE 802.11, IEEE 802.16, GSM, GPRS, CDMA, WCDMA, cdma200 technologies. The EPD 700 sends data to and receives data from corresponding APs via the four upstream communication I/Fs 751, 761, 771, and 781. The first AP, the second AP, the third AP, and the fourth AP are directly and/or indirectly communicatively coupled to a backbone network. "Upstream communication I/Fs" refers to communication I/Fs via which the EPD 700 interacts with four APs (i.e., the first AP, the second AP, the third AP, and the fourth AP) that are located nearer to the backbone network relative to the EPD 700.

The EPD 700 receives unique network address from each of the four APs upon association. The four APs are uniquely identified by corresponding network addresses. The EPD 700 stores a first AP address 709 corresponding to the first AP, a second AP address 711 corresponding to the second AP, a third AP address 713 corresponding to the third AP and a fourth AP address 715 corresponding to the fourth AP in a storage system 707 of the EPD 700. The EPD 700 is assigned a network address by an AP upon association with the AP. The EPD 700 being associated with the four APs (the first AP, the second AP, the third AP and the fourth AP), has four corresponding network addresses, referred here as EPD network addresses 721. The EPD 700 stores the EPD network addresses 721 in the storage system 707. The EPD 700 uses AP addresses 709, 711, 713 and 715 and the EPD network addresses 721 to exchange data with the four associated APs.

The EPD 700 is further adapted to store communication characteristics 719 in the storage system 707. The EPD 700 selectively measures the communication characteristics 719 and/or receives the communication characteristics 719 from the four associated APs. The communication characteristics 719 typically comprise interference on communication links between the EPD 700 and the four APs, power requirement of the EPD 700, delay in the CSDN and the PSDN with which the EPD 700 is currently associated, parameters corresponding to protocols that the EPD 700 uses to communicate with the four APs, etc. The EPD 700 further receives a plurality of rules 723 received from the four associated APs and stores the plurality of rules 723 in the storage system 707.

As an exemplary case, the EPD 700 is currently associated with the first AP, the second AP, and the third AP. The EPD 700 at a next instant of time associates with the fourth AP. The plurality of rules 723 direct the EPD 700 to send AP addresses of other APs to which the EPD 700 is currently associated to the fourth AP upon association with the fourth AP. The EPD 700 acts in accordance with the plurality of rules 723 by sending the first AP address 709, the second AP address 711 and the third AP address 713 to the fourth AP via the second wireless upstream communication I/F 781. The EPD 700 further sends a first rule to the fourth AP, where the first rule directs the fourth AP to use one of three delivered addresses, 709, 711 and 713, to send data to the EPD 700 if the EPD 700 detaches from the fourth AP at a later instant of time. The EPD 700 keeps the fourth AP informed about its disassociations and new associations. For example the EPD 700 detaches from the first AP. The EPD 700 sends a second rule to the fourth AP via the second wireless upstream communication I/F 781 informing the fourth AP about its detachment from the first AP. The fourth AP is thereby prompted not to use the first AP address 709 to send data to the EPD 700 after the EPD 700 detaches from the fourth AP. The first rule and the second rule are collectively called rules for AP(s) 725. The first rule and the second rule are generated by the processing circuitry 703 of the EPD 700.

The rules for AP(s) 725 in addition comprises a third rule regarding type of data the fourth AP sends to the EPD 700 using the other AP addresses (709, 711 and 713), frequency at which the fourth AP sends the data to the EPD 700 using the other AP addresses, duration for which the fourth AP sends data to the EPD 700 using the other AP addresses after the EPD 700 detaches (or disassociates) from the fourth AP. The third rule, in one embodiment, directs the fourth AP to send only data with low bandwidth requirement to the EPD 700 after detachment. The third rule additionally directs the fourth AP to send network health to the EPD 700 once in every two minutes. The third rule also prompts the fourth AP to send data to the EPD 700 for duration of, for example, ten minutes after detachment. The fourth AP sends data, in accordance with the rules for AP(s) 725, to the EPD 700 via the backbone network and using one of the three delivered addresses, 709, 711 and 713 after the EPD 700 detaches from the fourth AP. Detachment typically occurs due to the EPD 700 moving away from service area of the fourth AP, communication link quality between the fourth AP and the EPD 700 going below accepted level, the EPD 700 that typically has a limited number of communication I/Fs, choosing to interact with a fifth AP via the second wireless upstream communication I/F 781 instead of interacting with the fourth AP etc. The EPD 700 is further adapted to send a fourth rule (that is part of the rules of AP(s) 725) to the fourth AP after detachment. The EPD 700 is unable to communicate with the fourth AP via the second wireless upstream communication I/F 781 after detachment from the fourth AP. The EPD 700 hence sends the fourth rule to the fourth AP via any one of currently associated APs i.e., the first AP, the second AP and the third AP and the backbone network.

8 is a flow chart illustrating a method of delivering a data packet to an end-point device 861 by a first access point 805 via a second access point 851 and Internet backbone 831. The first AP (access point) 805 has a downstream communication interface (I/F). The first AP 805 associates with one EPD (end point device) at a time via the downstream communication I/F and exchanges data packets with the associated EPD via the downstream communication I/F. The first AP 805 has an upstream communication I/F via which the first AP 805 exchanges data packets with an upstream first node 821. The upstream first node is part, of a first packet switched data network (PSDN) and is communicatively coupled to the Internet backbone 831. The upstream communication I/F of the first AP 805 is so called because the first AP 805 uses this I/F to communicate with node that is located nearer to the Internet backbone 831 relative to any EPD with which the first AP is associated (not clear from the figure). The downstream communication I/F of the first AP 805 is so called because the first AP 805 uses this I/F to communicate with the associated EPD that is located farther from the Internet backbone 831 relative to the first AP 805 (not clear from the figure). "Upstream" and "downstream" do not refer to direction of flow of data packets.

At a first instant of time the first AP 805 is associated with the EPD 861. The first AP interacts with the first AP 805 via its downstream communication I/F. The EPD 861 is associated with a second AP 851 simultaneously. The first AP 805 receives network address of the second AP 851 from the EPD 861 via the downstream communication I/F. The first AP 805 stores the second AP address in local storage system of the first AP 805. At a second instant of time the EPD 861 detaches from the first AP 805. At a subsequent instant the first AP 805 attempts to send a data packet to the EPD 861 via its downstream communication I/F. Either the first AP 805 generates the data packet or the first AP 805 receives the data packet from the upstream first node 821 via its upstream communication I/F. The first AP 805 determines that the EPD 861 is detached if the attempt to send the data packet fails. The first AP 805 subsequently retrieves the second AP address from its local storage system and encapsulates the data packet with the second AP address. The first AP 805 sends the encapsulated data packet to the upstream first node 821 via its upstream communication I/F. The first AP 805 operates pursuant to a first protocol. The first protocol is any of a variety of proprietary or standard packet switched data communication protocols. The data packet comprises one of multimedia information, control information, network associated parameter, rule information for the EPD 861 etc.

The second AP 851 communicates with the EPD 861 via its downstream communication I/F and in addition communicates with an upstream second node 841 via its upstream communication I/F. The second node 841 is part of a second PSDN and is communicatively coupled to the Internet backbone 831. The Internet backbone 831 receives the encapsulated data packet from the first node 821 and using the second AP address attached with the encapsulated data packet routes the encapsulated data packet to the second node 841. The second node 841 subsequently sends the encapsulated data packet to the second AP 851 via the upstream communication I/F of the second AP 851. The second AP 851 removes encapsulation from the encapsulated data packet and determines that the data packet is destined for the EPD 861. The first AP 805 appends an identifier to the data packet to help the second AP 851 to identify destination of the data packet. The second AP 851 being currently associated with the EPD 861 sends the data packet to the EPD 861 via its downstream communication I/F. The second AP 851 operates pursuant to a second packet switched data communication protocol. The second protocol is communicatively incompatible with the first protocol. The first AP 805 in this exemplary case delivers the data packet to the EPD 861 via heterogeneous PSDNs, the first PSDN and the second PSDN, and the Internet backbone 831 even when the EPD 861 is detached from the first AP 805.

If more than one communication path exists from the first node 821 to the second node 841 via the Internet backbone 831 then the first PSDN, the Internet backbone 831 and the second PSDN cooperatively decide which one from existing pathways to be used for carrying the encapsulated data packet from the first node 821 to the second node 841. A unidirectional communication pathway from the first AP 805 to the second AP 851 suffices to support packet data flow in this exemplary case.

9 is a flow chart illustrating the method of delivering the data packet to the end-point device 861 by the first access point 805 via the second access point 851 and the Internet backbone 831 of FIG. 8, wherein a third access point 961 cooperates in delivering the data packet to the end-point device 971. The first AP (access point) 905 desires to send the data packet to the EPD 971 via its downstream communication I/F at an instant of time. An attempt to send the data packet via its downstream communication I/F fails and the first AP 905 retrieves network address of the second AP 941 from local storage system of the first AP 905. The first AP 905 received the second AP network address from the EPD 971 at a pervious instant of time when the first AP 905 was communicatively associated with the first AP 905. The EPD 971 was in addition communicatively associated with the second AP 941 at the pervious instant of time. The first AP 905 at the instant of time encapsulates the data packet with the retrieved second AP network address and an EPD identifier and sends the encapsulated data packet to the first node 911 via its upstream communication I/F on the assumption that the EPD 971 is communicatively associated with the second. AP 941 at the instant of time. The encapsulated data packet travels via the first node 911 (i.e., the first PSDN), the Internet backbone 921, the second node 931 (i.e., the second PSDN) and upstream communication I/F of the second AP 941 to reach the second AP 941.

As a way of example and without limitation the EPD 971 detaches from the second AP 941 prior to the instant of time. The second AP 941 being unable to send the encapsulated data packet received via its upstream communication I/F to the detached EPD 971 via its downstream communication I/F at the instant of time retrieves network addresses of other APs from local storage system of the second AP 941. The other APs refer to APs with which the EPD 971 was associated simultaneously while being associated with the second AP 941. The second AP 941 selects network address of a third AP 961 from the stored addresses of the other APs. The second AP 941 removes the second AP network address from the encapsulated data packet that the second AP 941 receives from the first AP 905 via the Internet backbone 921 and encapsulates the data packet with the third AP network address. The second AP 951 sends thus encapsulated data packet to the second node 931 via the upstream communication I/F of the second AP 941. The second node 931, using the second AP network address accompanying the encapsulated data packet, forwards the encapsulated data packet to the Internet backbone 921. The Internet backbone 921 delivers the encapsulated data packet to the third AP 961 via a third node 951. The third AP 961 receives the encapsulated data packet via its upstream communication I/F and transmits the encapsulated data packet to the EPD 971 that is currently associated with the third AP 961, via its downstream communication I/F.

Each of the first AP 905, the second AP 941, and the third AP 961 are communicatively coupled to the Internet backbone 921 via the first node 911, the second node 931, and the third node 951 respectively. The first node 911 and the first AP 905 belong to the first PSDN (Packet switched data network). The first AP 905 may be alternately directly coupled to the Internet backbone 921. The first PSDN supports packet switched data communication using a first protocol. The first AP 905 and the first node 911 operate pursuant to the first protocol. The second AP 941 and the third AP 961 belong to the second PSDN and a third PSDN respectively. One or both of the second AP 941 and the third AP 961 may be directly coupled to the Internet backbone 921. The second PSDN and the third PSDN operate pursuant to a second packet switched data communication protocol and a third packet switched data communication protocol respectively. One or combination of the first protocol, the second protocol, and the third protocol is communicatively incompatible with rest of three protocols. The EPD 971 exchanges data packets with the first AP 905 using the first protocol. The EPD 905 being associated with the third AP 961 at the instant of time receives the encapsulated data packet that originated at the first AP 905, from the third AP 961 using the third protocol. The third AP 961 cooperates with the second AP 941 to deliver the data packet that originated at the first AP 905, to destination i.e., the EPD 971. The second AP network address and the third AP network address are typically, for example, IP (Internet Protocol) addresses.

FIG. 10 is a flow chart illustrating a method of delivery of detachment command to an upstream access point via an upstream pathway by an end-point device, wherein selection of the upstream pathway depends on status of association of the end-point device with the access point. The EPD (end-point device) communicatively associates with the upstream AP (access point) in a block 1001. Association refers to the EPD receiving a unique network address of the AP from the AP and the EPD and the AP agreeing to exchange data using a protocol. The protocol is either a packet switched data protocol or a circuit switched data protocol. The EPD is one of, for example, a fixed client device such as a PC, video game box, a moving client device such as a mobile phone, notebook, a portable client device such as a PDA, a server etc. The AP is a transceiver that has at least one downstream radio and at least one upstream radio. The AP exchanges data with the associated EPD via the at least one downstream radio and directly or indirectly interacts with a backbone network via the at least one upstream radio. The AP is typically a fixed terminal that may in addition be portable.

In the present embodiment the EPD has a plurality of radios and the EPD is adapted to interact with a plurality of APs using the plurality of radios. For example, the EPD is associated with the AP via a first radio from its plurality of radios. The EPD is simultaneously associated with a secondary AP via a second radio from its plurality of radios. The EPD sends network address of the secondary AP to the AP in a next step 1011. The EPD sends the network address of the secondary AP either immediately after association with the AP or immediately before detaching from the AP. The EPD, in another embodiment, keeps the AP updated about network addresses of secondary AP(s) with which the EPD is currently associated by sending the network addresses of the secondary AP(s) to the AP at regular intervals.

The EPD decides to detach from the AP in a next step 1021. The EPD sends a detachment command to the AP. The detachment command comprises a plurality of rules that the AP follows after the EPD detaches from the AP until the EPD re-associates with the AP. The plurality of rules directs the AP to use an alternate pathway to communicate with the EPD after detachment i.e., once the EPD is no longer communicable via the downstream communication I/F of the AP. The plurality of rules comprises type of data the AP sends to the EPD via the alternate pathway, how frequently the AP sends the data to the EPD via the alternate pathway etc. In a first variant of the present embodiment the EPD sends the detachment command to the AP prior to detaching from the AP. In such case the EPD executes the step 1011 and the step 1021 prior to detachment from the AP and using the first radio of the EPD. The EPD uses direct upstream path to the AP to send the network address of the secondary AP and the detachment command as shown in a next block 1031. In a second variant of the present embodiment the EPD executes the step 1011 prior to detachment while executes the step 1021 after detachment. In such embodiment the EPD sends the detachment command to the AP via the secondary AP. All APs including the AP and the secondary AP in the present embodiment are communicatively coupled to each other via the backbone network. The detachment command sent to the secondary AP and destined for the AP gets routed by the backbone network and ultimately reaches destination i.e., the AP. In a third variant of the present embodiment the EPD executes the steps 1011 and 1021 after detaching from the AP. In the third variant of the present embodiment the EPD uses the second radio to transmit the network address of the secondary AP and the detachment command to the secondary AP. The EPD selects an indirect pathway via the secondary AP and the backbone network to deliver the detachment command to the AP both in the second variant and the third variant of the present embodiment.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A communication infrastructure supporting packet switched communications, the communication infrastructure comprising:

a backbone network supporting the packet switched communications;

a first service provider network, communicatively coupled to the backbone network, having a first access point that has a first network address, the first access point operating pursuant to a first wireless protocol;

a second service provider network, communicatively coupled to the backbone network, having a second access point that has a second network address, the second access point operating pursuant to a second wireless protocol, the second wireless protocol being communicatively incompatible with the first wireless protocol;

an end-point device having wireless transceiver circuitry for communicating with the first access point and the second access point;

and the first access point delivers the first network address to the second access point via the end-point device to support the end-point device; and one of the first access point and the second access point further delivers rule information to the other of the first access point and the second access point, wherein the rule information includes a rule parameter to be used in selecting a data delivery pathway to the end-point device in the event that the end-point device becomes detached from one of the first access point and the second access point;

and wherein the rule parameter further comprises instructions to transmit only network parameters of the detached one of first access point and second access point, to the end point device via the backbone network and via the non-detached one of the first access point and the second access point and further instructions to store data packets destined for the end point device in the detached one of the first access point and the second access point for delivery to the end point device when the end point device re-associates with the detached one of said first access point or the second access point.

2. A communication infrastructure supporting packet switched communications, the communication infrastructure comprising:

a backbone network supporting the packet switched communications;

a first service provider network, communicatively coupled to the backbone network, having a first access point that has a first network address, the first access point operating pursuant to a first wireless protocol;

a second service provider network, communicatively coupled to the backbone network, having a second access point that has a second network address, the second access point operating pursuant to a second wireless protocol, the second wireless protocol being communicatively incompatible with the first wireless protocol;

an end-point device having wireless transceiver circuitry for communicating with the first access point and the second access point; and the first access point and the second access point exchange first rule information and a second rule information, wherein the first rule information comprises a rule parameter indicating a condition to be considered by the second access point in selecting a data delivery pathway to the end-point device after detachment of the end-point device from the second access point;

and wherein the rule parameter further comprises instructions to transmit only network parameters of the detached second access point, to the end point device via the backbone network and via the non-detached first access point and further instructions to store data packets destined for the end point device in the detached second access point for delivery to the end point device when the end point device re-associates with the detached second access point.

3. The communication infrastructure of claim 2, wherein the exchange takes place via the end-point device.

4. The communication infrastructure of claim 2, wherein the exchange takes place via the backbone network.

5. The communication infrastructure of claim 2, wherein the first access point delivers the first rule information to the second access point via the end-point device and the second access point delivers the second rule information to the first access point via the backbone network.

6. The communication infrastructure of claim 2, wherein the first rule information is associated with the second access point.

7. The communication infrastructure of claim 2, wherein the first rule information is associated with the end-point device.

8. The communication infrastructure of claim 2, wherein the first rule information comprises a rule regarding delivery of a data packet from the second access point to the end-point device after detachment of the end-point device from the second access point.

9. An end-point device in a communication infrastructure having a backbone network, a primary access point and a secondary access point, the primary access point and the secondary access point respectively having a first network address and a second network address associated with the backbone network, the primary access point and the secondary access point respectively managing a first wireless network and a second wireless network, the first wireless network being communicatively incompatible with the second wireless network, the end-point device comprising:

processing circuitry;

radio circuitry via which the processing circuitry communicatively couples with the primary access point and the secondary access point to receive the first network address from the primary access point via the radio circuitry; and the processing circuitry delivers the first network address and rule information to the secondary access point via the radio circuitry, the rule information indicating a condition to be considered by the secondary access point in selecting from among a plurality of data delivery pathways to the end-point device after detachment of the end-point device from the secondary access point;

and wherein the rule information further comprises instructions to transmit only network parameters of the detached secondary access point, to the end point device via the backbone network and via the non-detached primary access point and further instructions to store data packets destined for the end point device in the detached secondary access point for delivery to the end point device when the end point device re-associates with the detached secondary access point.

10. The end-point device of claim 9, wherein the radio circuitry comprising a first radio and a second radio, the first radio for communicating with the primary access point and the second radio for communicating with the secondary access point.

11. The end-point device of claim 9, wherein the processing circuitry receives the second network address from the secondary access point via the radio circuitry; and the processing circuitry delivers the second network address to the primary access point via the radio circuitry for use by the primary access point in supporting communication between the backbone network and the processing circuitry.

12. The end-point device of claim 9, wherein the delivery by the processing circuitry occurs in response to detecting detachment from the primary access point.

13. The end-point device of claim 9, wherein the delivery of the first network address to the secondary access point is made in anticipation of detachment from the secondary access point.

14. A communication infrastructure supporting packet switched communications, the communication infrastructure comprising:
   a backbone network supporting the packet switched communications;
   a first access point, communicatively coupled to the backbone network, that has a first network address, the first access point operating pursuant to a first wireless protocol;
   a second access point, communicatively coupled to the backbone network, that has a second network address, the second access point operating pursuant to a second wireless protocol;
   an end-point device having wireless transceiver circuitry for communicating with the first access point and the second access point;
   the first access point receives the second network address from the second access point via the end-point device; and
   one of the first access point and the second access point further delivers rule information to the other of the first access point and the second access point, wherein the rule information includes a rule parameter to be used in selecting a data delivery pathway to the end-point device after detachment of the end-point device from one of the first access point and the second access point;
   and wherein the rule parameter further comprises instructions to transmit only network parameters of the detached one of first access point and second access point, to the end point device via the backbone network and via the non-detached one of the first access point and the second access point and further instructions to store data packets destined for the end point device in the detached one of the first access point and the second access point for delivery to the end point device when the end point device re-associates with the detached one of said first access point or the second access point.

15. The communication infrastructure of claim 14, wherein the first and second wireless protocols are a same wireless protocol.

16. The communication infrastructure of claim 14, wherein the first and second wireless protocols are incompatible.

17. A first access point in a communication infrastructure, the communication infrastructure also having a backbone network, a second access point and a destination device, the destination device storing both a first network address and a second network address, the first access point comprising:
   upstream communication interface circuitry, communicatively coupled to the backbone network;
   downstream communication interface circuitry through which the first network address is used to communicate with the destination device;
   processing circuitry, communicatively coupled to the upstream communication interface circuitry and to the downstream communication interface circuitry, that receives the second network address and a rule parameter from the destination device, the rule parameter relating to use of the second network address via the upstream communication interface circuitry; and
   the processing circuitry selectively uses the second network address and the rule parameter to support communication flow between the backbone network and the destination device in response to a detachment of the destination device from the first access point;
   and wherein the rule parameter further comprises instructions to transmit only network parameters of the detached first access point, to the destination device via the backbone network and via the non-detached second access point and further instructions to store data packets destined for the destination device in the detached first access point for delivery to the destination device when the destination device re-associates with the detached first access point.

18. The first access point of claim 17, wherein the rule parameter relates to the use of the second network address upon detachment of the destination device from the downstream communication interface.

19. The first access point of claim 17, wherein the receiving of the second network address and the rule parameter occurs via the downstream communication interface circuitry.

20. The first access point of claim 17, wherein the receiving of the second network address and the rule parameter occurs via the upstream communication interface circuitry.

21. A method performed by a first access point in a communication infrastructure, the communication infrastructure having a backbone network, a destination device and a second access point, the first access point and the second access point are both communicatively coupled to the backbone network, the first access point manages a first downstream network using a first protocol, the second access point manages a second downstream network using a second protocol, the method comprising:
   storing a first network address that is associated with the first downstream network;
   using the first network address to support communication exchanges between the backbone network and the destination device via the first downstream network;
   receiving and storing, independent of a handoff between the first access point and the second access point, a second network address and associated rule information wherein the second network address identifies the second access point, and wherein the rule information indicates a condition to be considered in selecting a data delivery pathway;
   detecting detachment of the destination device from the first access point; and
   using the second network address in conformance with the associated rule information to support communication with the destination device via the second downstream network;
   and wherein the rule information further comprises instructions to transmit only network parameters of the detached first access point, to the destination device via the backbone network and via the non-detached second access point and further instructions to store data packets destined for the destination device in the detached first access point for delivery to the destination device when the destination device re-associates with the detached first access point.

22. The method of claim 21, wherein the second network address and associated rule information is received from the destination device.

23. The method of claim 21, wherein the second network address and associated rule information is received via the first downstream network.

24. The method of claim 21, wherein the second network address and associated rule information is received via the backbone network.

* * * * *

UNITED STATES PATENT AND TRADEMARK OFFICE
CERTIFICATE OF CORRECTION

| | | |
|---|---|---|
| PATENT NO. | : 8,625,548 B2 | Page 1 of 1 |
| APPLICATION NO. | : 11/641368 | |
| DATED | : January 7, 2014 | |
| INVENTOR(S) | : James D. Bennett | |

It is certified that error appears in the above-identified patent and that said Letters Patent is hereby corrected as shown below:

On the Title Page, Item (54) and in the Specification, Column 1, line 1, the Title should appear:
"ACCESS POINTS OF DIFFERENT TYPES EXCHANGING ADDRESSES AND RULES TO SUPPORT END POINT DEVICES"

Signed and Sealed this
Second Day of September, 2014

Michelle K. Lee
*Deputy Director of the United States Patent and Trademark Office*